United States Patent
Dragt

(10) Patent No.: US 8,577,346 B2
(45) Date of Patent: Nov. 5, 2013

(54) SYSTEMS, METHODS, AND APPARATUS FOR RECEIVING PROMOTION INFORMATION BY A MOBILE DEVICE

(75) Inventor: Bruce Dragt, Marietta, GA (US)

(73) Assignee: First Data Corporation, Greenwood Village, CO (US)

( * ) Notice: Subject to any disclaimer, the term of this patent is extended or adjusted under 35 U.S.C. 154(b) by 329 days.

(21) Appl. No.: 12/396,259

(22) Filed: Mar. 2, 2009

(65) Prior Publication Data

US 2010/0222026 A1    Sep. 2, 2010

(51) Int. Cl.
H04M 3/42 (2006.01)
(52) U.S. Cl.
USPC ........................ 455/414.2; 455/3.04
(58) Field of Classification Search
USPC ............... 455/414.2, 412.1, 466, 456.2, 3.04, 455/3.01; 709/217; 725/32; 705/14.64, 705/14.1, 3, 4, 5, 6
See application file for complete search history.

(56) References Cited

U.S. PATENT DOCUMENTS

| | | | |
|---|---|---|---|
| 3,209,086 A | 9/1965 | Boylan | |
| 4,368,354 A | 1/1983 | Furihatd | |
| 5,574,962 A | 11/1996 | Fardeau | |
| 5,642,425 A | 6/1997 | Kawakami | |
| 5,787,334 A | 7/1998 | Fardeau | |
| 5,809,425 A | 9/1998 | Colwell et al. | |
| 6,044,158 A | 3/2000 | Terpening | |
| 6,370,389 B1 | 4/2002 | Isomursu et al. | |
| 6,449,346 B1 | 9/2002 | Katz | |
| 6,597,890 B1 * | 7/2003 | Sibecas et al. | 455/3.04 |
| 6,598,890 B2 | 7/2003 | Mears et al. | |
| 6,604,085 B1 | 8/2003 | Kolls | |
| 6,662,007 B2 | 12/2003 | Yuen | |
| 6,934,684 B2 | 8/2005 | Alpdemir | |
| 7,065,494 B1 | 6/2006 | Evans | |
| 7,092,724 B2 | 8/2006 | Fellenstein | |
| 7,124,937 B2 | 10/2006 | Myers et al. | |
| 7,188,065 B2 | 3/2007 | Mihcah | |
| 7,188,352 B2 | 3/2007 | Nathan | |
| 7,310,522 B2 | 12/2007 | Geile | |
| 7,328,236 B2 | 2/2008 | Hayek et al. | |
| 7,343,317 B2 | 3/2008 | Jokinen | |
| 7,433,452 B2 | 10/2008 | Taylor et al. | |
| 7,460,991 B2 | 12/2008 | Jones et al. | |

(Continued)

OTHER PUBLICATIONS

Non-final Office Action for U.S. Appl. No. 12/396,265 mailed Jan. 4, 2011 (filed Mar. 2, 2009).

(Continued)

*Primary Examiner* — Kwasi Karikari
*Assistant Examiner* — Alexander Yi
(74) *Attorney, Agent, or Firm* — Sutherland Asbill & Brennan LLP

(57) ABSTRACT

Systems, methods, and apparatus receiving promotion information by a mobile device are provided by certain embodiments of the invention. According to one embodiment, an information carrying tone may be received at a mobile device from a tone transmission device, wherein the information carrying tone includes at least one location identifier associated with promotion information. A tone processing application of the mobile device may further provide for processing the information carrying tone to extract at least one location identifier, and to transmit, to an information source, an indication responsive to receiving the information carrying tone. Also according to various aspects, following transmission of the indication, promotional information can be received by the mobile device for subsequent processing and utilization, such as an activation confirmation or a redeemable promotion.

25 Claims, 9 Drawing Sheets

(56) References Cited

U.S. PATENT DOCUMENTS

| | | | |
|---|---|---|---|
| 7,463,898 B2 | 12/2008 | Bayne | |
| 7,487,362 B2 | 2/2009 | Steenstra | |
| 7,505,922 B1* | 3/2009 | Philyaw | 705/26.1 |
| 7,721,958 B2 | 5/2010 | Belfer et al. | |
| 2001/0055391 A1 | 12/2001 | Jacobs | |
| 2002/0010621 A1 | 1/2002 | Bell | |
| 2002/0095333 A1* | 7/2002 | Jokinen et al. | 705/14 |
| 2002/0120501 A1 | 8/2002 | Bell | |
| 2002/0126813 A1 | 9/2002 | Partovi | |
| 2002/0133818 A1 | 9/2002 | Rottger | |
| 2003/0028601 A1* | 2/2003 | Rowe | 709/206 |
| 2003/0200184 A1 | 10/2003 | Dominguez et al. | |
| 2004/0133789 A1 | 7/2004 | Gantman | |
| 2005/0105725 A1 | 5/2005 | Lee | |
| 2005/0124351 A1 | 6/2005 | Black | |
| 2006/0014569 A1 | 1/2006 | DelGiorno | |
| 2006/0084488 A1 | 4/2006 | Kinsley | |
| 2006/0174274 A1* | 8/2006 | Vance et al. | 725/45 |
| 2006/0240808 A1 | 10/2006 | Crolley | |
| 2007/0063027 A1 | 3/2007 | Belfer et al. | |
| 2007/0078709 A1 | 4/2007 | Rajaram | |
| 2007/0179853 A1 | 8/2007 | Feige et al. | |
| 2007/0187482 A1 | 8/2007 | Castro | |
| 2007/0189474 A1 | 8/2007 | Cai | |
| 2007/0297455 A1 | 12/2007 | McParland | |
| 2008/0010215 A1 | 1/2008 | Rackley, III et al. | |
| 2008/0019706 A1 | 1/2008 | Levinson | |
| 2008/0065507 A1 | 3/2008 | Morrison | |
| 2008/0114481 A1 | 5/2008 | Braithwaite et al. | |
| 2008/0152138 A1 | 6/2008 | Chiu | |
| 2008/0215436 A1 | 9/2008 | Roberts | |
| 2008/0262928 A1 | 10/2008 | Michaelis | |
| 2009/0076912 A1 | 3/2009 | Rajan et al. | |
| 2009/0143057 A1 | 6/2009 | Arun et al. | |
| 2009/0249388 A1* | 10/2009 | Seidel et al. | 725/32 |
| 2010/0030838 A1 | 2/2010 | Atsmon et al. | |
| 2010/0106647 A1 | 4/2010 | Raman | |
| 2010/0211431 A1 | 8/2010 | Lutnick | |
| 2010/0222037 A1 | 9/2010 | Dragt | |
| 2010/0222038 A1 | 9/2010 | Dragt et al. | |
| 2010/0222041 A1 | 9/2010 | Dragt et al. | |
| 2010/0222043 A1 | 9/2010 | Dragt et al. | |
| 2010/0222072 A1 | 9/2010 | Dragt et al. | |
| 2010/0222087 A1 | 9/2010 | Dragt et al. | |
| 2010/0222088 A1 | 9/2010 | Dragt et al. | |
| 2010/0222100 A1 | 9/2010 | Dragt et al. | |
| 2010/0223120 A1 | 9/2010 | Dragt et al. | |
| 2010/0223138 A1 | 9/2010 | Dragt et al. | |
| 2010/0223145 A1 | 9/2010 | Dragt | |
| 2010/0223346 A1 | 9/2010 | Dragt et al. | |
| 2010/0226526 A1 | 9/2010 | Modro et al. | |

OTHER PUBLICATIONS

Disclosure Under 37 C.F.R. 1.56 (3 pages).
"Hearing Test—Can you Hear It?" Freemosquitoringtones.org. <http://www.freemosquitoringtones.org/hearing_test>. (4 pages).
Christensen-Dalsgaard, Jakob. "Center for Sound Communicaiton". Biology.sdu.dk. Oct. 17, 2000. Sep. 22, 2008. <http://www.biology.sdu.dk/Center_for_Lydkommunikation/gb/CSChome-eng.html>. (3 pages).
"Shazam on iPhone". Shazam.com. <http://www.shazam.com/music/web/pages/iphone.html>. (5 pages).
"Background". Shazam.com. <http://www.shazam.com/music/web/pages/background.html>. (2 page).
"FAQs—Mosquito Teen Deterrent". Compoundsecurity.co.uk. <http://www.compoundsecurity.co.uk/faqs>. (1 page).
Vitello, Paul. (Jun. 12, 2006). "A Ring Tone Meant to Fall on Deaf Ears." New York Times. Retrieved from http://www.nytimes.com. (3 pages).
"Radio Receiption on the Move and RDS (Radio Data System)". bbc.com. <http://www.bbc.co.uk/reception/info/pdf/factsheet_radiomove_rds.html>. (3 pages).
Non-final Office Action for U.S. Appl. No. 12/396,256 mailed Jul. 8, 2011.
Non-final Office Action for U.S. Appl. No. 12/396,248 mailed Aug. 30, 2011.
Non-final Office Action for U.S. Appl. No. 12/396,271 mailed Sep. 15, 2011.
Non-final Office Action for U.S. Appl. No. 12/396,241 mailed Apr. 14, 2011.
Final Office Action for U.S. Appl. No. 12/396,265 mailed Apr. 15, 2011.
Non-final Office Action for U.S. Appl. No. 12/396,261 mailed Apr. 26, 2011.
Non-final Office Action for U.S. Appl. No. 12/396,268 mailed May 3, 2011.
Non-final Office Action for U.S. Appl. No. 12/396,255 mailed May 23, 2011.
Non-final Office Action for U.S. Appl. No. 12/396,240 mailed May 25, 2011.
Non-final Office Action for U.S. Appl. No. 12/396,258 mailed Jun. 8, 2011.
Non-final Office Action for U.S. Appl. No. 12/396,263 mailed Sep. 16, 2010.
Final Office Action for U.S. Appl. No. 12/396,263 mailed Feb. 10, 2011.
Non-final Office Action for U.S. Appl. No. 12/396,242 mailed Aug. 3, 2011.
Non-final Office Action for U.S. Appl. No. 12/396,265 mailed Dec. 23, 2011.
Final Office Action for U.S. Appl. No. 12/396,240 mailed Nov. 2, 2011.
Final Office Action for U.S. Appl. No. 12/396,258 mailed Nov. 4, 2011.
Final Office Action for U.S. Appl. No. 12/396,248 mailed Dec. 21, 2011.
Non-final Office Action for U.S. Appl. No. 12/396,258 mailed Feb. 16, 2012.
Final Office Action for U.S. Appl. No. 12/396,265 mailed Mar. 28, 2012.
Non-final Office Action for U.S. Appl. No. 12/396,265 mailed Aug. 22, 2012.
Final Office Action for U.S. Appl. No. 12/396,258 mailed Aug. 9, 2012.
Final Office Action for U.S. Appl. No. 12/396,265 mailed Mar. 28, 2013.
Notice of Allowance for U.S. Appl. No. 12/396,258 mailed Mar. 25, 2013.
Non-final Office Action for U.S. Appl. No. 12/396.248 mailed Jun. 18, 2013.

* cited by examiner

SYSTEMS, METHODS, AND APPARATUS FOR RECEIVING PROMOTION INFORMATION BY A MOBILE DEVICE

CROSS-REFERENCE TO RELATED APPLICATIONS

This application is related to U.S. patent application Ser. No. 12/396,241, filed Mar. 2, 2009 and entitled "Systems, Methods, and Devices for Administering Consumer Rewards Programs Through the Use of Tones Sent to Mobile Devices"; U.S. patent application Ser. No. 12/396,258, filed Mar. 2, 2009 and entitled "Systems, Methods, and Apparatus for Providing Promotion Information to a Mobile Device"; U.S. patent application Ser. No. 12/396,240, filed Mar. 2, 2009 and entitled "Systems, Methods, and Apparatus for Marketing by Communicating Tones to a Mobile Device"; U.S. patent application Ser. No. 12/396,255, filed Mar. 2, 2009 and entitled "Systems, Methods, and Apparatus for Communicating Information to a Mobile Device in a Broadcast Signal"; U.S. patent application Ser. No. 12/396,261, filed Mar. 2, 2009 and entitled "Systems, Methods, and Apparatus for Facilitating Communication Between Mobile Devices"; U.S. patent application Ser. No. 12/396,248, filed Mar. 2, 2009 and entitled "Systems, Methods, and Devices for Prompting Mobile Device Users for Feedback Information Using Tone Transmissions"; U.S. patent application Ser. No. 12/396,265, filed Mar. 2, 2009 and entitled "Systems, Methods, and Apparatus for Facilitating Transactions Using a Mobile Device"; U.S. patent application Ser. No. 12/396,242, filed Mar. 2, 2009 and entitled "Systems, Methods, and Apparatus for Providing Terms and Conditions and Program Enrollment Information to a Mobile Device"; U.S. patent application Ser. No. 12/396,256, filed Mar. 2, 2009 and entitled "Systems, Methods, and Devices for Communicating Supplemental Information to Mobile Devices"; U.S. patent application Serial No. 12/396,268, filed Mar. 2, 2009 and entitled "Systems, Methods, and Apparatus for Receiving Information by a Mobile Device"; U.S. patent application Ser. No. 12/396,271, filed Mar. 2, 2009 and entitled "Systems, Methods, and Apparatus for Providing Information to a Mobile Device"; and U.S. patent application Ser. No. 12/396,263, filed Mar. 2, 2009 and entitled "Systems, Methods, and Devices for Processing Feedback Information Received from Mobile Devices Responding to Tone Transmissions." Each of these applications is incorporated by reference herein in its entirety.

FIELD OF THE INVENTION

Embodiments of the invention relate generally to mobile devices, and more particularly, to systems, methods, and apparatus for receiving promotion information by a mobile device.

BACKGROUND OF THE INVENTION

A wide variety of promotional marketing and advertising methods and techniques are utilized to provide promotional information, such as advertisements, coupons, rebates, sale information, and/or discount offers, to a consumer. Examples of traditional promotional techniques include the use of flyers, mailings, coupon dispensers, and freestanding newspaper inserts. More modern marketing techniques, including the use of modern technologies and communication media including the use of email, the Internet, etc. Each of these examples may provide a consumer with promotional information, such as an offer to participate or enroll in a marketing program, to open an account, and the like.

However, conventional communication techniques such as advertisements, mailings, flyers, and email communications typically cannot be tailored or customized per the customer and/or validated or activated in real-time or near real-time. Instead, various conventional techniques typically can only transmit active coupons or other incentives, and cannot tailor or otherwise limit the promotion program based on an individual, based on the number of individuals already participating, and/or permit real-time or near-real-time responses, information, and feedback. Moreover, these various conventional techniques fall short of enticing the consumer with sufficient information, while at the same time increasing the conveniences on the consumer and decreasing the costs and efforts of the entity maintaining the marketing or other program. First, with some promotion marketing techniques, such as billboards, posters, radio advertisements, and television advertisements, the consumer is not provided with information that they can review at a later point in time. The consumer may also desire additional information for regarding the promotion that is not provided by a billboard or poster. Additionally, with conventional marketing techniques, the consumer may be provided with information that is easily misplaced or lost and, therefore, not readily accessible at a subsequent point in time. The entities offering or maintaining marketing promotions can benefit from obtaining analyzing the performance or conditions of the promotion before activating the promotion for the customer; however, doing so can be cumbersome and impractical with these conventional techniques.

With the widespread use of mobile devices, such as cellular phones or smart phones, new methods for providing promotional information to consumers have been developed. For example, text message advertisements may be sent to a mobile device. Conventional mobile marketing techniques, such as text message advertisements, may have costs associated with them that a user of a mobile device is unwilling to pay. Moreover, these new mobile marketing techniques are limited to communications via the single channel of cellular communications and typically only with individuals that have expressly opted for receiving the communications. Accordingly, these conventional mobile marketing techniques may not reach a given segment of a target audience.

Therefore, a need exists in the art for systems, methods, and apparatus for addressing some or all of the shortcomings and limitations of existing promotion communication techniques.

SUMMARY OF THE INVENTION

Some or all of the above needs and/or problems may be addressed by certain embodiments of the invention. Embodiments of the invention may include systems, methods, and apparatus for receiving promotion information by a mobile device. According to one embodiment, a method for receiving a promotion at a mobile device is provided. The method may include receiving an information carrying tone at a mobile device from a tone transmission device, wherein the information carrying tone includes at least one location identifier associated with promotion information. The method may further include processing, by a tone processing application, the information carrying tone to extract the at least one location identifier, and transmitting, to an information source, an indication responsive to receiving the information carrying tone.

According to another embodiment, a mobile device for receiving a promotion is provided. The mobile device may include at least one input device operable to receive an information carrying tone from a tone transmission device, wherein the information carrying tone includes at least one location identifier associated with promotion information; at least one network interface operable to receive and transmit data over a network; and at least one processor. The process may be operable to execute computer-executable instructions to receive the information carrying tone from the tone transmission device, process the information carrying tone to extract the at least one location identifier, and transmit, to an information source via the at least one network interface, an indication responsive to receiving the information carrying tone.

According to yet another embodiment, a computer program product for processing promotion information is provided. The computer program product may include a computer usable medium having a computer readable program code embodied therein. The computer readable code can be adapted to be executed to receive an information carrying tone at a mobile device from a tone transmission device, wherein the information carrying tone comprises at least one location identifier associated with promotion information, process the information carrying tone to extract the at least one location identifier, and transmit an indication responsive to receiving the information carrying tone.

Additional systems, methods, apparatus, features, and aspects are realized through the techniques of various embodiments of the invention. Other embodiments and aspects of the invention are described in detail herein and are considered a part of the claimed invention. Other advantages and features can be understood with reference to the description and to the drawings.

BRIEF DESCRIPTION OF THE DRAWINGS

Figure 1:
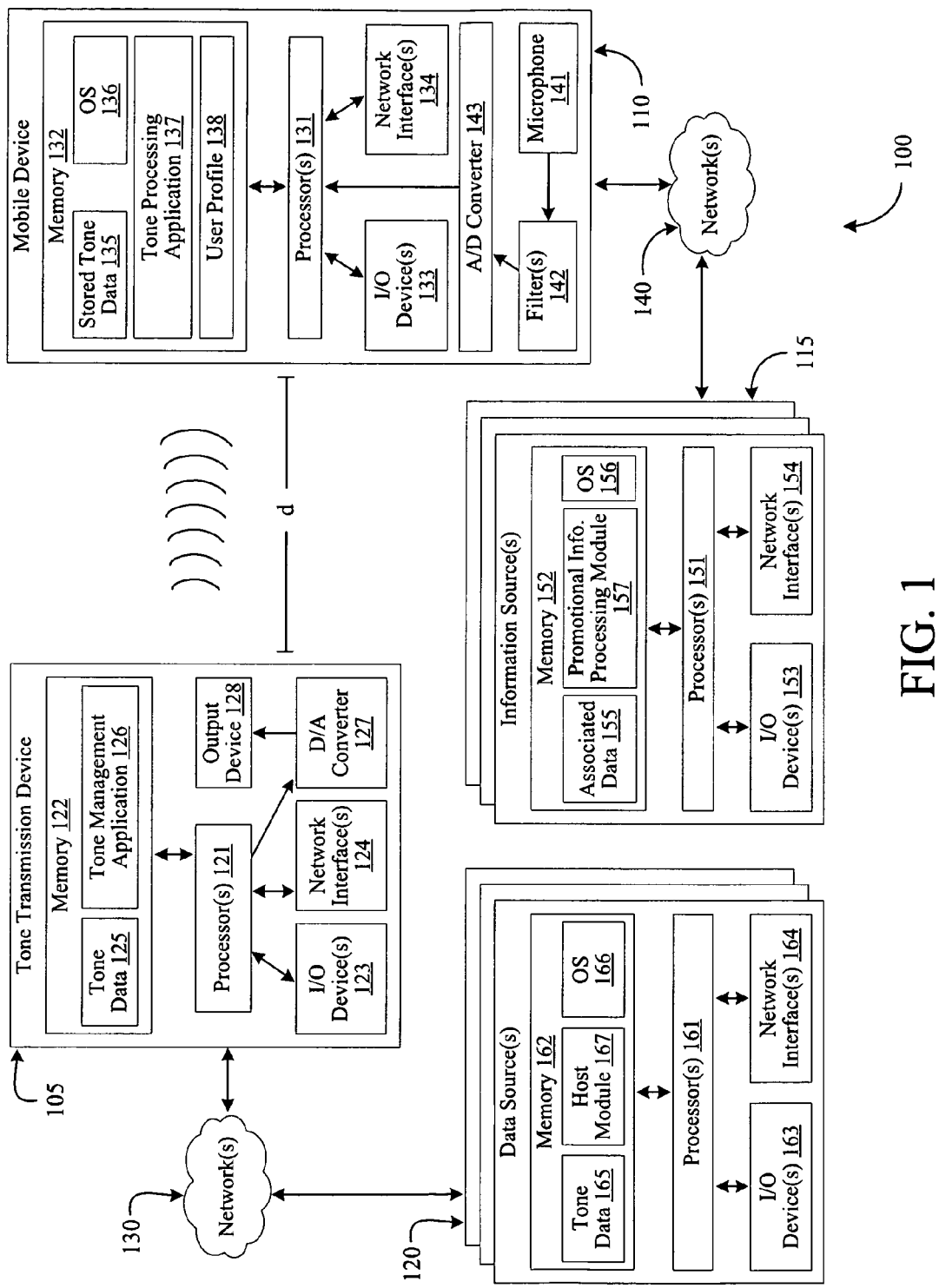

Having thus described the invention in general terms, reference will now be made to the accompanying drawings, which are not necessarily drawn to scale, and wherein:

FIG. 1 is a schematic diagram of one example system that may facilitate the communication of information to a mobile device, according to an illustrative embodiment of the invention.

Figure 2:
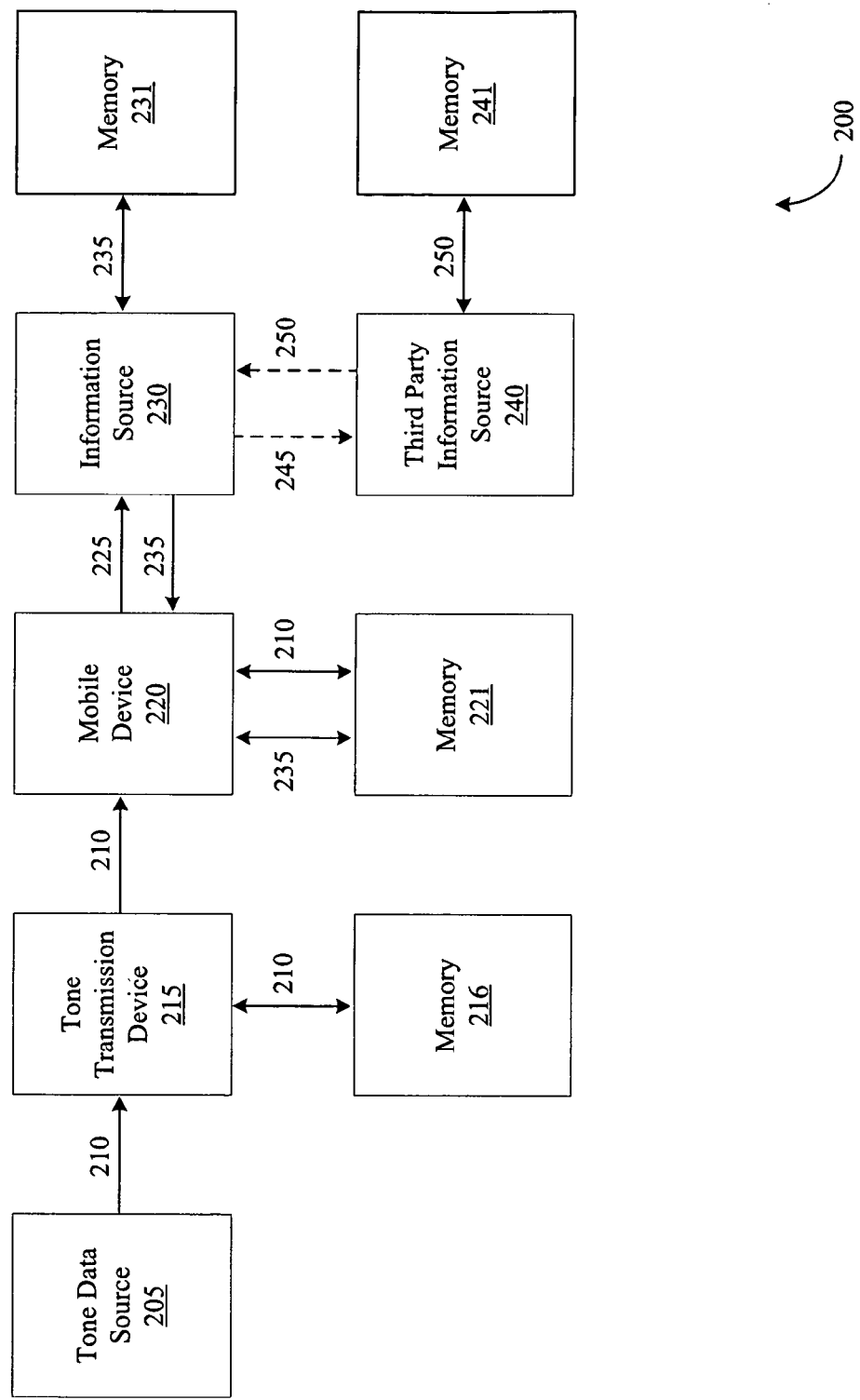

FIG. 2 is a diagram of one example data flow of transmitting a tone and retrieving information associated with the tone, according to an illustrative embodiment of the invention.

Figure 3:
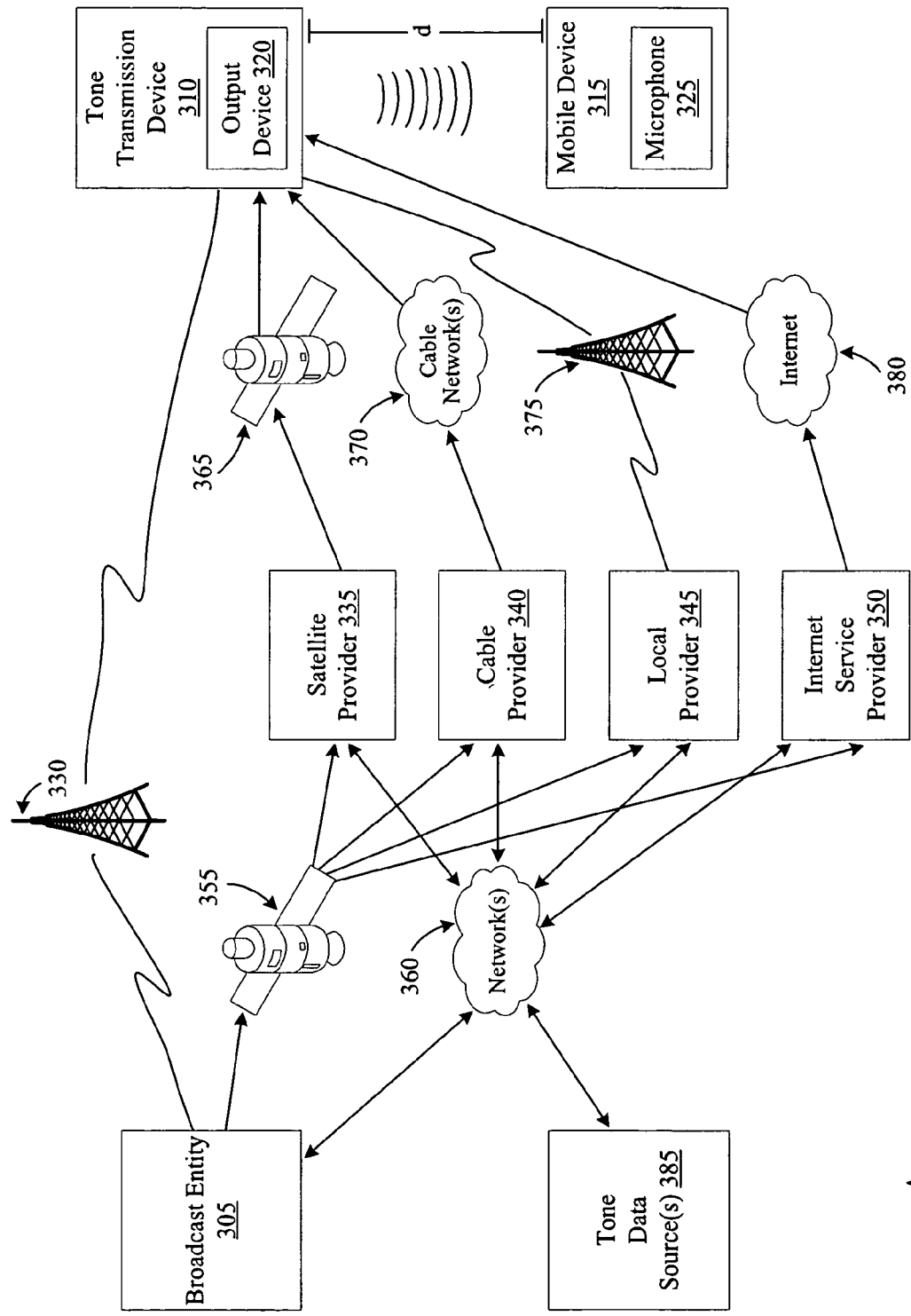

FIG. 3 is a schematic diagram of yet another example system that may facilitate the communication of information to a mobile device, according to an illustrative embodiment of the invention.

Figure 4:
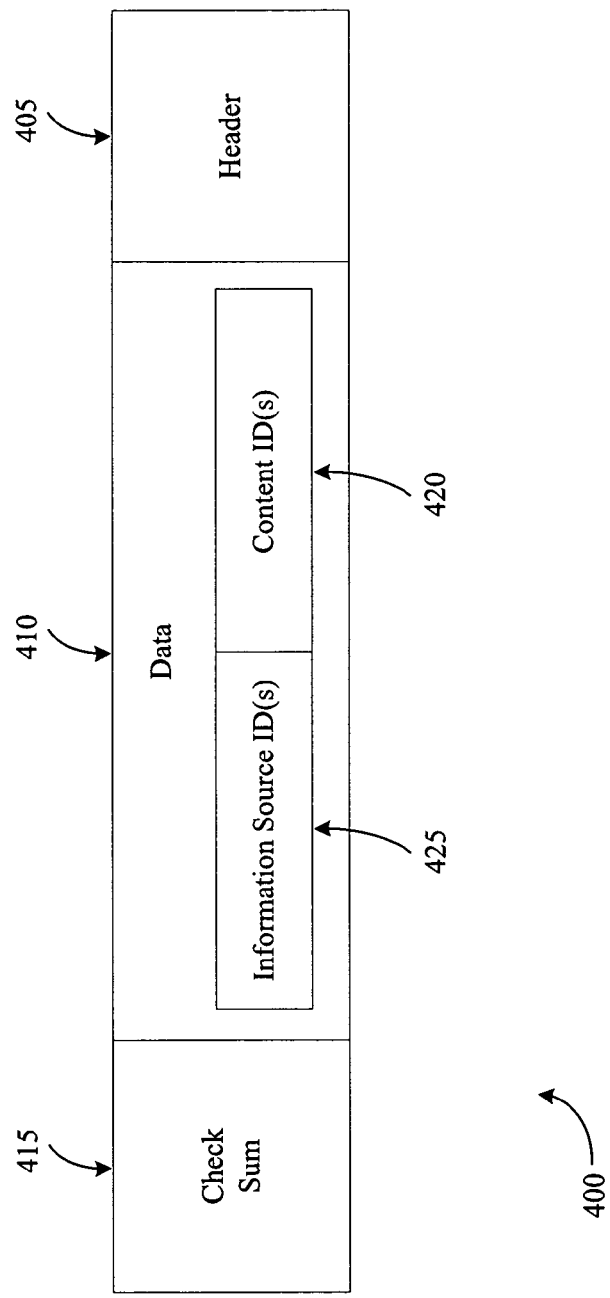

FIG. 4 is a block diagram of data that may be included in an example tone, according to an illustrative embodiment of the invention.

Figure 5:
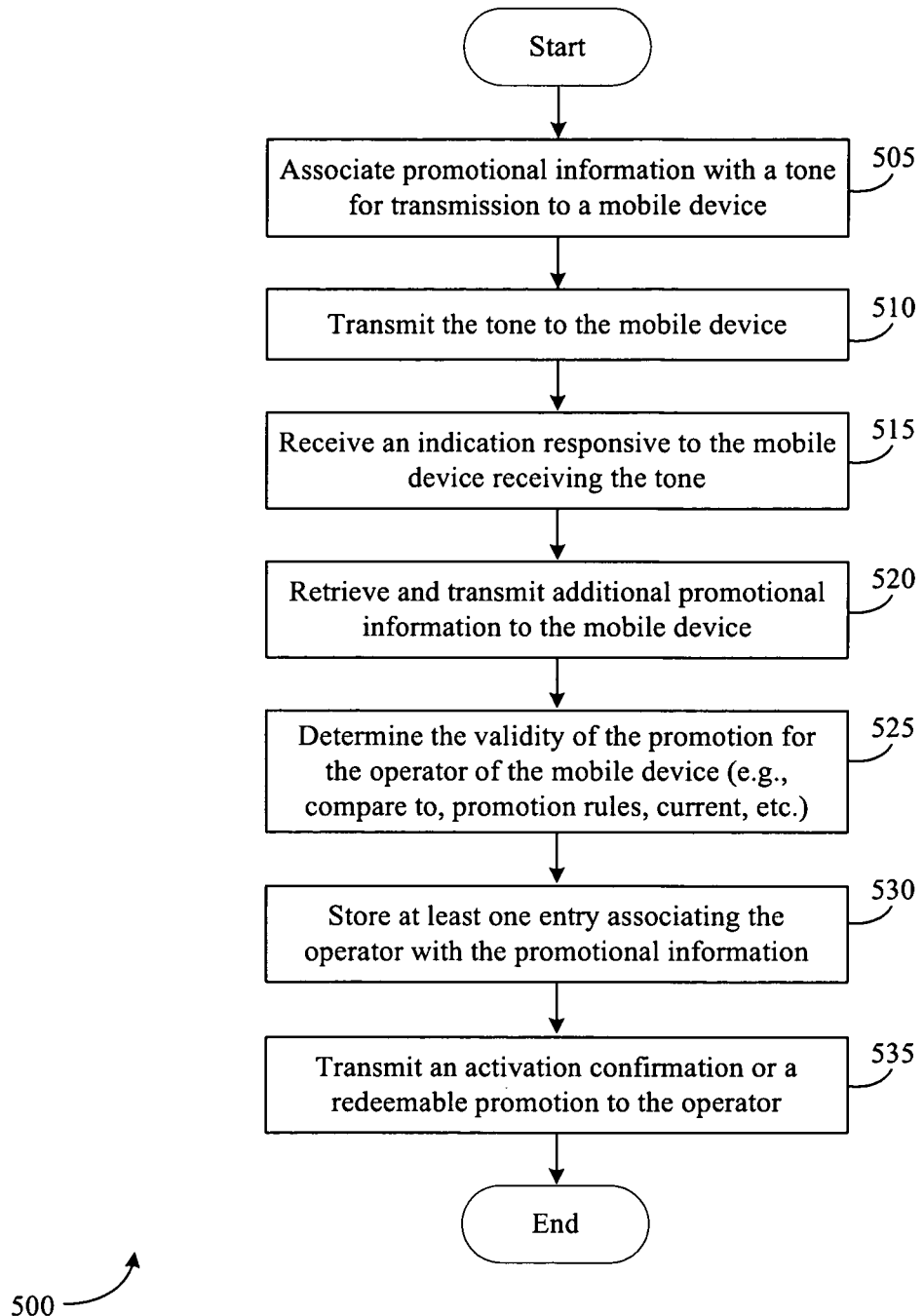

FIG. 5 is a flow chart of one example method for processing promotional information at an information source that is associated with a tone output to a mobile device by a tone transmission device, according to an illustrative embodiment of the invention.

Figure 6:
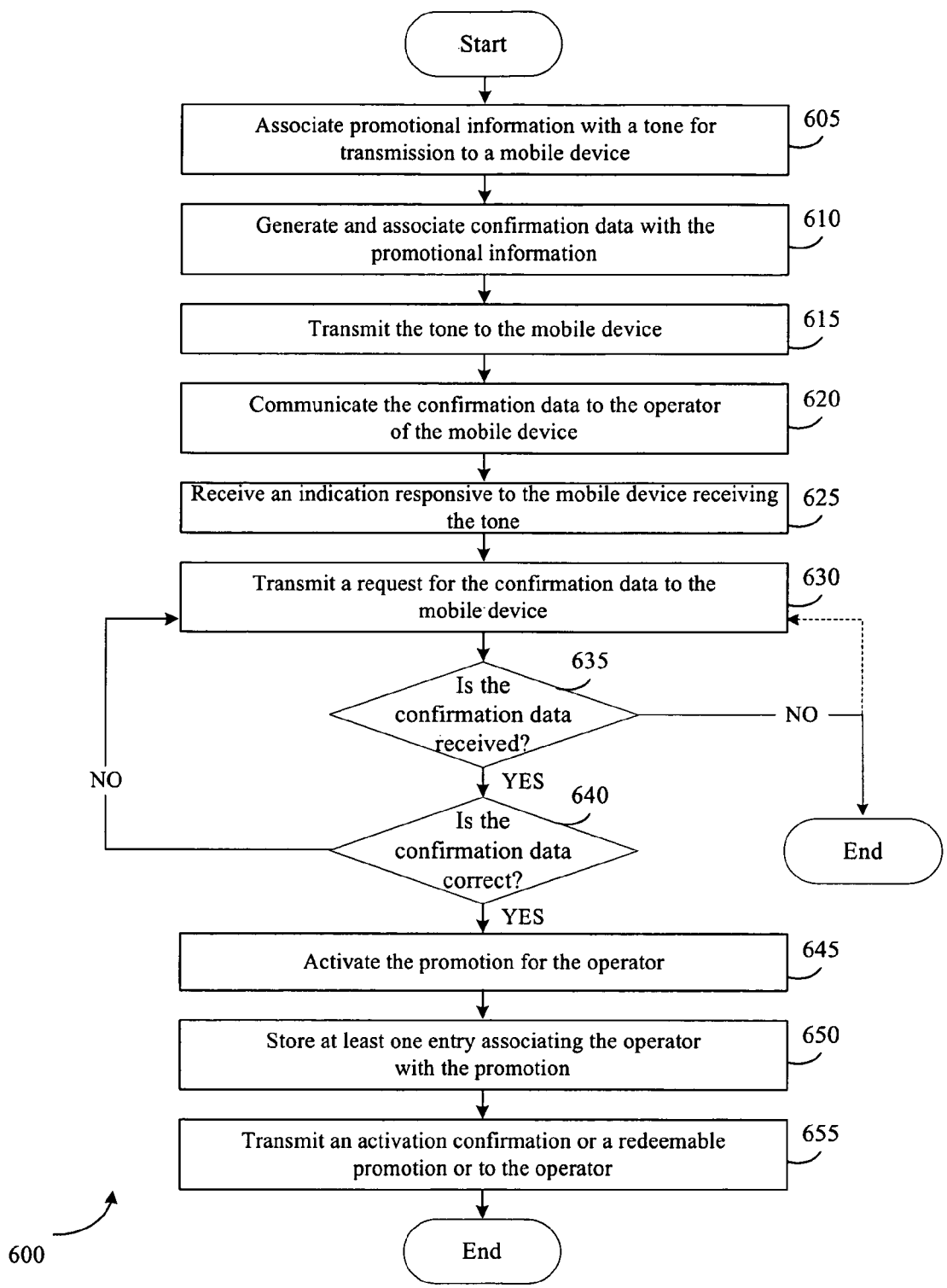

FIG. 6 is a flow chart of one example method for processing promotional information including confirmation data at an information source that is associated with a tone output to a mobile device by a tone transmission device, according to an illustrative embodiment of the invention.

Figure 7:
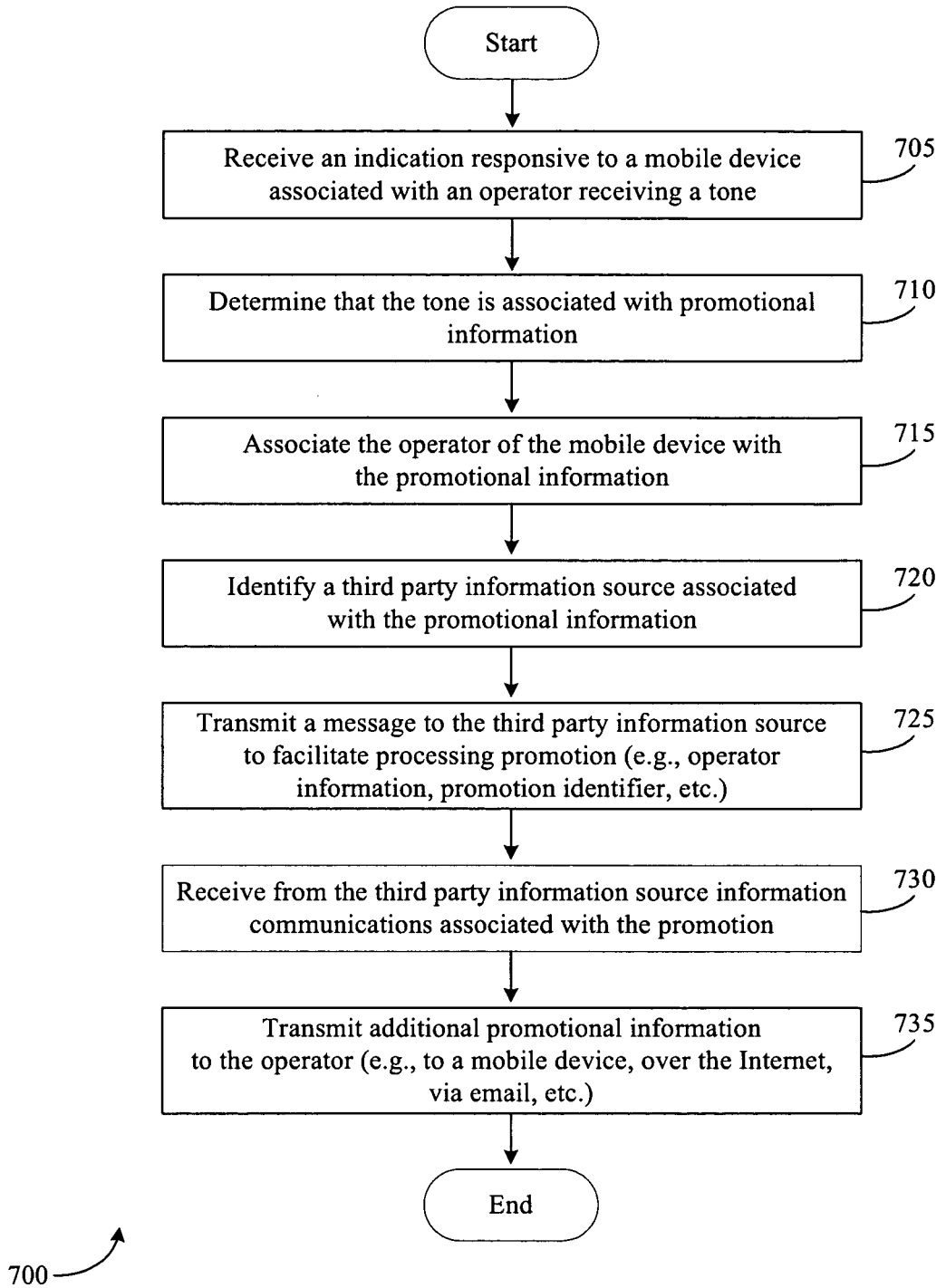

FIG. 7 is a flow chart of one example method for processing promotional information with multiple information sources that is associated with a tone output to a mobile device by a tone transmission device, according to an illustrative embodiment of the invention.

Figure 8:
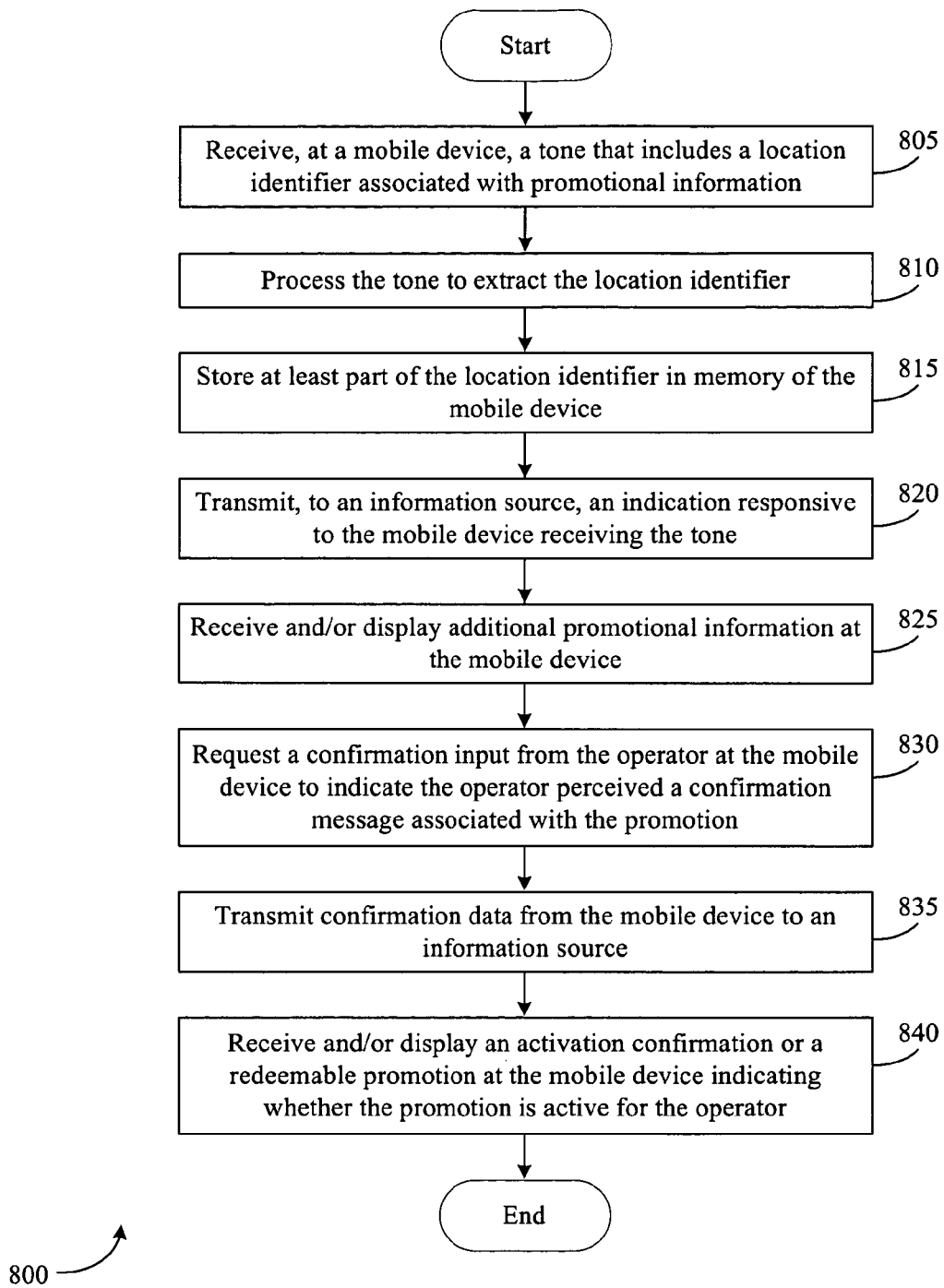

FIG. 8 is a flow chart of one example method for processing a tone on a mobile device, according to an illustrative embodiment of the invention.

Figure 9:
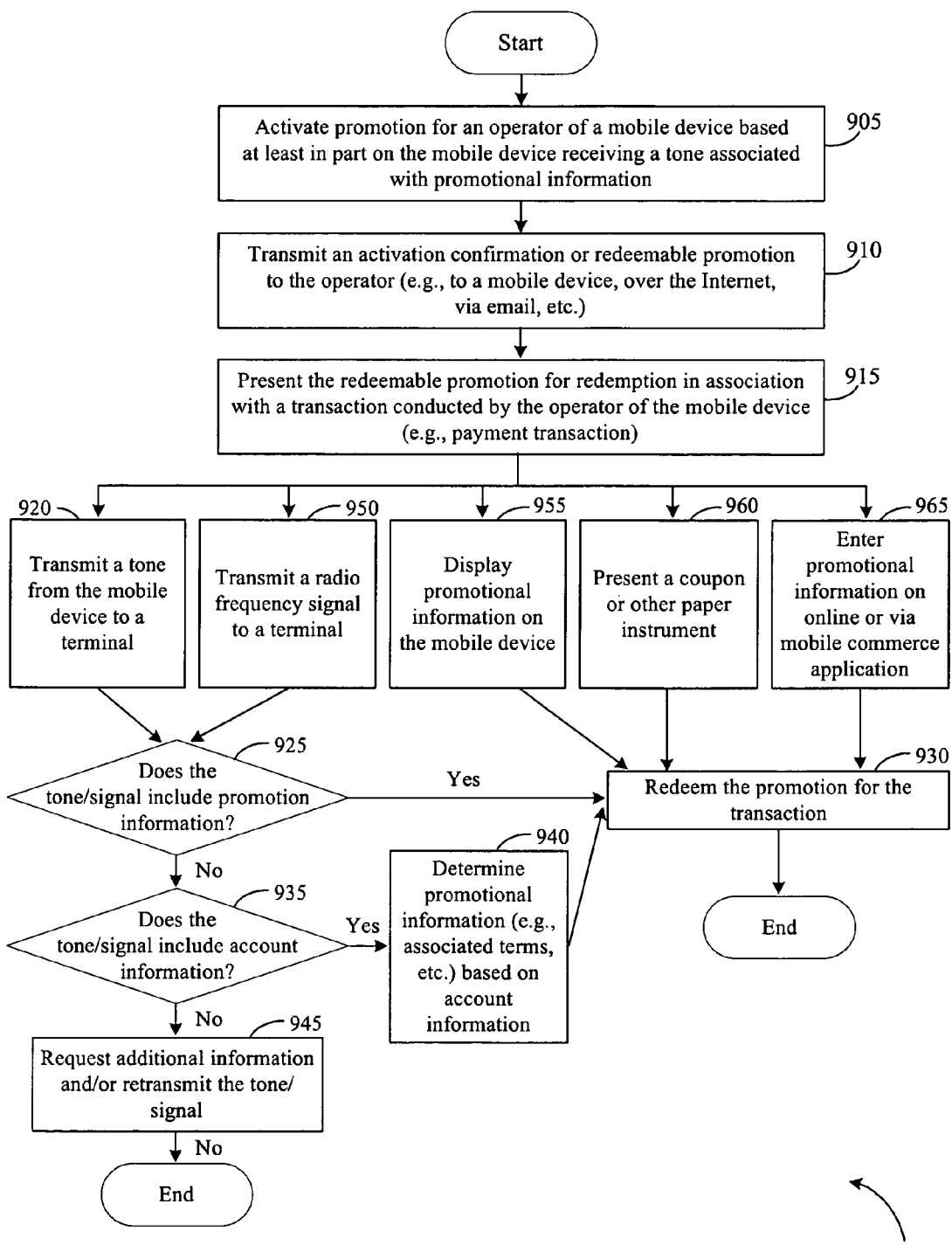

FIG. 9 is a flow chart of one example method for presenting a redeemable promotion, according to an illustrative embodiment of the invention.

DETAILED DESCRIPTION OF EMBODIMENTS OF THE INVENTION

Example embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

In accordance with embodiments of the invention, systems, methods, and apparatus for receiving promotional information by a mobile device are provided. In addition, according to various embodiments of the invention, additional systems, methods, and apparatus to perform additional processing and utilization of the promotional information upon receipt by the mobile devices are also provided. The widespread use of mobile devices, such as cellular phones or smart phones, provides a new, very effective channel to reach potential customers to transmit information, such as marketing information like promotions, offers, coupons, discounts, and the like. Moreover, mobile devices provide a relatively simple and convenient means to request additional information and feedback from potential customers, as well as automatically monitor downstream uses tied to the promotional information transmitted to the mobile devices.

Various embodiments described herein can include receiving and subsequently processing promotional information by a mobile device, which may be used to encourage consumer behavior and/or purchasing of goods and services. The terms "promotional information," "promotions," and "offers" are used interchangeably herein, and each refers to information and/or programs to encourage consumer behavior, such as, but not limited to, coupons, discounts, special offers, introductory prices, trial periods, free goods or services, or any other incentive offered to a consumer. In various examples, the promotional information may provide or be associated with redeemable promotions or instruments for redemption during a transaction, such as a purchase of a good or service. The terms "redeemable promotion" and "actual redeemable promotion" are used interchangeably herein, and each refers to an instrument that can be presented and effect the incentive provided by the promotion, including, but not limited to, a coupon, an access code, an authorization code, a barcode, a password, an image, a graphic display or depiction of a coupon, an electronic file, a printable image or depiction of coupon, or any other means for indicating the terms and/or validity of the promotion.

As used herein, the term "tone" may refer to a tone carrying information that may be communicated or transmitted to a mobile device by a tone transmission device. The terms "tone" and "information carrying tone" may be used interchangeably herein. A wide variety of methods and/or techniques may be utilized to facilitate the communication of a tone from a tone transmission device to a mobile device. In certain embodiments of the invention, a tone may be output by one or more suitable output devices associated with the tone transmission device, for example, one or more speakers, and the tone may be received by one or more suitable input devices associated with the mobile device, for example, a microphone. A tone may be a wave, such as an elastic wave, a primary wave or P-wave, that is propagated between the tone transmission device and the mobile device. In certain embodiments of the invention, a tone may be a vibration wave that is propagated though a solid, liquid, or gas. For example, in various embodiments of the invention, a tone may be a sound wave that is emitted or otherwise output by the tone transmission device for reception by a mobile device. Tones in accordance with embodiments of the invention may have a wide variety of different frequencies and/or amplitudes as desired. For example, in some embodiments, a tone may be a sound wave that is within a range that may be detected by the human ear, for example, a sound wave with a frequency between approximately 20 hertz and approximately 20 kilohertz. In such an example embodiment of the invention, it may be desirable to have the tone be produced at a frequency range that is not detectable by the naked ear for at least a significant portion of the human population (e.g., a frequency range of 17 kilohertz-20 kilohertz). In other embodiments, a tone may be a sound wave that is outside the normal range that may be detected by the human ear, for example, a sound wave with a frequency above approximately 21 kilohertz. In these embodiments, a tone may be transmitted to a mobile device without being aurally detected by a user of the mobile device. Once received, the tone may be processed by the mobile device to extract the information included in the tone. Information embedded in or otherwise carried by the tone can include one or more location identifiers, or other unique identifiers, as described in more detail with reference to FIG. 4.

As used herein, the term "tone transmission device" may be any device, system, apparatus, or combination thereof that facilitates the communication of a tone to a mobile device. A tone transmission device may facilitate mobile marketing by communicating tones to a mobile device that are associated with various marketing information. Additionally, for purposes of this disclosure, the terms "tone transmission device" and "tone transmission system" may be used interchangeably. Examples of tone transmission devices include, but are not limited to, devices that are situated within a poster, billboard, etc., devices that are situated within a retail location (e.g., devices situated on the shelves of a grocery store), mobile devices, radios, televisions, speaker systems, public broadcast systems, public announcement system, speaker systems, public broadcast systems, public announcement systems, point of sale terminals, computers, projectors, etc. Some example tone transmission devices and tone transmission systems are discussed in greater detail below.

As used herein, the term "mobile device" may refer to any mobile device that is operable to receive a tone from a tone transmission device. Mobile devices may be devices that are carried by a target user and information, such as marketing information, may be communicated to the user via the mobile devices. Examples of mobile devices include, but are not limited to, cellular phones, iPhones, smart phones, personal digital assistants (PDA's), pagers, digital audio players, handheld portable computing devices, digital tablets, laptop computers, etc. Additionally, for purposes of this disclosure, the terms "mobile device," "mobile communications device," "mobile phone," "cellular phone," and "cell phone" may be used interchangeably.

Various embodiments described herein can include receiving promotion information on a mobile device. According to one embodiment, the transmission of promotional information can be initiated by communicating an information carrying tone to a mobile device, whereby the tone includes tone data that is associated with promotional information. In addition, embodiments may further include transmitting via the mobile device an user's responses and/or input to the mobile device, which may be further processed by one or more entities, such as a back-end processor capable of maintaining location identifier and associated promotional information, and/or merchants, marketers, service providers, financial institutions, or other entities with which respective promotions are associated. Accordingly, interacting with a mobile device to transmit promotional information or any other associated information, creates a beneficial channel for interacting with potential customers.

Various tone transmission devices may be operable to transmit information carrying tones with associated promotional information, such as a television transmitting audiovisual content including an information carrying tone, a radio transmitter transmitting radio content including an information carrying tone, or a stand-alone tone generation device having the primary purpose to generate and/or transmit information carrying tones, such as may be used in retail displays or other advertisement displays, for example, as described with reference to FIG. 1.

For example, while at a merchant's facility, an individual may observe an advertisement display indicating that a promotion may be available (e.g., a promotion associated with a good sold), and subsequently elect to receive an information carrying tone at the individual's mobile device from a standalone tone transmission device positioned near or associated with the advertisement display. In another example, an individual may be watching television programming or listening to radio programming that is broadcasting an advertisement indicating that audience members may participate in a promotion if they elect to receive an information carrying tone that is simultaneously being broadcast with the advertising content over the television or radio. Upon receiving an information carrying tone at the mobile device, the mobile device may communicate with a back-end processor (also referred to herein as an "information source") to receive additional promotional information and/or to validate or otherwise activate the promotion for that individual.

One or more entities can facilitate the generation, transmission, processing, and other management of promotional information communications using the information carrying tones. For example, a central information source, such as a back-end processor, may create tones and associate tone data therewith. A central information source may also facilitate the transmission of tone data, such as by coordinating with a television or radio broadcaster or by providing standalone tone transmission devices at merchants or with other advertising media. In some embodiments, a central information source may interact with one or more third party entities, such as merchants, manufacturers, or service providers for which promotions are being run. For example, a central information source may communicate with a third party entity (also referred to interchangeably herein as a "third party information source"), sending information received from mobile devices in association with information carrying tones, or requesting information to send to a mobile device, either as tone data or separately.

In addition, in various example embodiments, upon receiving promotional information, whether it be the initial information carrying tone and associated tone data, or subsequently transmitted promotional information, such as a redeemable promotion, the individual can present the received promotional information for redemption. For example, a redeemable promotion can be transmitted from the mobile device to a transaction terminal (e.g., a point of sale ("POS") terminal at a merchant) for redemption in association with a purchase (or other transaction). In another example, the promotional information may be displayed on the display screen of the mobile device, such that the merchant may manually account for the promotion during redemption. In yet another example, the promotional information may be downloaded and/or printed, such as from a personal computer, a kiosk, a POS terminal, and the like.

Due to the integration with the individual's mobile device, such as during initial inquiry and during redemption, certain entities, such as back-end processors, merchants, manufacturers, service providers, and the like, may be configured to obtain status updates and track the individual's activities associated with the promotions via the mobile device. For example, individual feedback may be requested from the consumer via the mobile device. In another example, the mobile device may transmit messages to back-end processors or merchants (or any other entity) upon performing pre-defined activities (e.g., upon receiving promotional information, upon redeeming promotional information, etc.).

Accordingly, integrating promotional information processing and distribution with mobile device communications not only creates a simple and cost-effective channel for accessing potential consumers and transmitting promotional information, but may also permit closer tracking of consumers' behaviors regarding the respective promotions.

A wide variety of different systems may be utilized as desired in various embodiments of the invention to communicate information to a mobile device. A few example system are discussed below with reference to FIGS. 1-7.

Illustrative System Overview

FIG. 1 is a schematic diagram of one example system 100 that may facilitate the communication of information to a mobile device 110, according to an illustrative embodiment of the invention. The system 100 may be utilized to facilitate the communication of a wide variety of different information to a mobile device 110 through the use of communicating one or more tones to the mobile device 110. The system 100 may include a tone transmission device 105, a mobile device 110, and one or more information sources 115.

The tone transmission device 105 may be any suitable or appropriate device or system that facilitates the communication of a tone to a mobile device 110. In this regard, the tone transmission device 105 may facilitate mobile marketing. The tone transmission device 105 may be situated or placed in a wide variety of different locations or environments as desired in various embodiments of the invention. For example, the tone transmission device 105 may be incorporated into or situated proximate to a poster, billboard, sign, or other advertisement. The tone output by the tone transmission device 105 may be associated with a product or service that is referenced by the poster, billboard, sign, or other advertisement. As another example, the tone transmission device 105 may be situated at a merchant location, such as, a retail establishment. The tone transmission device 105 may be incorporated into or situated proximate to one or more products at the merchant location. For example, the tone transmission device 105 may be located on a shelf at the merchant location next to a product associated with a tone that is output by the tone transmission device 105 or the transmission device 105 may be located next to or incorporated into a cashier's station or kiosk inside the merchant location. As another example, the tone transmission device 105 may be any conventional television, radio, computer, or projector operable to transmit content, such as video and/or audio content, as further described with reference to FIG. 3. As another example, the tone transmission device 105 may be a speaker system, public announcement system, or public broadcasting system that is situated within a merchant location, a sporting venue, or some other location. As another example, the tone transmission device 105 may be a speaker system, public announcement system, or public broadcasting system that is situated within a merchant location, a sporting venue, or some other location. As yet another example, the tone transmission device 105 may be a mobile device that is operable to communicate a tone to another mobile device 110. As another example, the tone transmission device 105 may be a portable audio device (e.g., iPod, portable radio, etc.), a radio, a television, or other device that is capable of outputting a tone.

In certain embodiments of the invention, the size and/or dimensions of the tone transmission device 105 may be based at least in part on the application of the tone transmission device 105. For example, if the tone transmission device 105 is incorporated into a poster, the tone transmission device 105 may have relatively small dimensions that facilitate its incorporation into the poster. As another example, a tone transmission device 105 that is situated on or near a shelf at a merchant location may have relatively small dimensions. For example, the tone transmission device 105 may have a size that is smaller than or approximately equal to that of a conventional coupon holder. In yet another example, the tone transmission device 105 may be any conventional television, radio, computer, or projector, as further described with reference to FIG. 3. Additionally, the tone transmission device 105 may utilize a wide variety of different power sources as desired in various embodiments of the invention, for example, battery power, a direct current power source, an alternating current power source, or a network provided power source (e.g., power provided via a telephone line).

The tone transmission device 105 may be a processor driven device that facilitates the outputting and communication of a tone that may be received by a mobile device 110. For example, the tone transmission device 105 may include any number of special purpose computers or other particular machines, application specific circuits, microcontrollers, personal computers, minicomputers, and the like. In certain embodiments, the operations of the tone transmission device 105 may be controlled by computer-executed or computer-implemented instructions that are executed by one or more processors associated with the tone transmission device 105. The instructions may be embodied in one or more software components as desired in various embodiments of the invention. The execution of the instructions may form a special purpose computer or other particular machine that is operable to communicate a tone to a mobile device 110. The one or more processors that control the operations of the tone transmission device 105 may be incorporated into the tone transmission device 105 and/or in communication with the tone transmission device 105 via one or more suitable networks. In certain embodiments of the invention, the operations and/or control of the tone transmission device 105 may be distributed amongst several processing components.

The tone transmission device 105 may include one or more processors 121, one or more memory devices 122, one or more input/output (I/O) interface(s) 123, and one or more network interface(s) 124. The one or more memory devices 122 may be any suitable memory devices, for example, caches, read only memory devices, random access memory devices, magnetic storage devices, etc. The one or more memory devices 122 may store data, executable instructions, and/or various program modules utilized by the tone transmission device 105, for example, tone data 125 and/or a tone management application 126. The tone data 125 may include stored data associated with a tone that is output by the tone transmission device. For example, the tone data may include stored digital data associated with a tone, such as, a Waveform audio format (WAV) file, MPEG-1 Audio Layer 3 (MP3) file, Moving Picture Experts Group (MPEG) file, Audio Interchange File Format (AIFF) file, Advanced Audio Coding (AAC) file, Apple Lossless file, or other digital media file format. As another example, the tone data may include stored analog data associated with a tone, for example, magnetically stored analog data. Additionally, in certain embodiments of the invention, data associated with a tone may be received by the tone transmission device 105 and output by the tone transmission device 105 without being stored in one or more memory devices 122. Thus, in some embodiments of the invention the tone transmission device 105 does not include the one or more memory devices 122.

In certain embodiments of the invention, the tone transmission device 105 may include a tone management application 126. The tone management application 126 may include computer-executable instructions that facilitate the management of one or more tones by the tone transmission device 105. For example, the tone management application 126 may facilitate and/or control the receipt of tone data or other information associated with a tone, the generation of tone data, the storage of tone data, the accessing of stored tone data, the conversion of tone data into a form that may be output by the tone transmission device 105, and/or the output of a tone by the tone transmission device 105. In certain embodiments, the conversion of tone data into a form that may be output by the tone transmission device 105 may transform digital tone data into analog data that may be output by one or more suitable output devices, for example, one or more speakers. In certain embodiments of the invention, the tone management application 126 may also facilitate and/or control network communication between the tone transmission device 105 and one or more external devices, such as, one or more data sources 120. Although the tone management application 126 is illustrated as a single software component, the tone management application 126 may include any number of software components, modules, and/or applications as desired in various embodiments of the invention.

The one or more I/O interfaces 123 may facilitate communication between the tone transmission device 105 and one or more input/output devices, for example, a universal serial bus port, a serial port, a disk drive, a CD-ROM drive, infrared receiver, and/or one or more user interface devices, such as, a display, keyboard, keypad, mouse, control panel, touch screen display, remote control, microphone, etc. that facilitate user interaction with the tone transmission device 105. The one or more I/O interfaces may be utilized to receive or collect tone data from a wide variety of input devices. For example, tone data may be received from a portable memory device (e.g., thumb drive, portable hard drive, etc.) via the one or more I/O interfaces. Following receipt of the tone data via the one or more I/O interfaces, the received tone data may be processed by the tone management application 126 and stored in a memory device 122 associated with the tone transmission device 105. Additionally, in certain embodiments, the one or more I/O interfaces may be utilized to receive user input from a user of the tone transmission device 105, for example, a programmer of the tone transmission device 105. In this regard, one or more user preferences associated with the operation of the tone transmission device 105 may be received and processed. In certain embodiments of the invention, user input may be received by the tone transmission device 105 indicating a desire to have a tone output by the tone transmission device 105. For example, a user may press a button or activate a sensor associated with a tone transmission device 105, thereby causing the tone transmission device to output a tone. In certain embodiments of the invention, user input may be received by the tone transmission device 105 indicating a desire to have a tone output by the tone transmission device 105. For example, a user may press a button or activate a sensor associated with a tone transmission device 105, thereby causing the tone transmission device to output a tone.

The one or more network interfaces 124 may facilitate connection of the tone transmission device 105 to one or more suitable networks 130, for example, a local area network, a wide area network, the Internet, a telephone network, a broadcast network, a cellular network, a Bluetooth enabled network, a Wi-Fi network, a radio frequency network, any wired network, any wireless network, etc. In this regard, the tone transmission device 105 may receive tone data and/or user input from one or more external devices, network components, and/or systems via the one or more networks 130. For example, the tone transmission device 105 may receive tone data from one or more data sources 120 via the one or more networks 130. As one example, if the tone transmission device 105 is located at a merchant location, then the tone transmission device 105 may receive tone data from one or more data sources 120 located at the merchant location via a local area network. As another example, if the tone transmission device 105 is a television, then the tone transmission device 105 may receive tone data in association with a television signal, transmission, or broadcast received via a suitable television network (e.g., broadcast, cable, satellite, Internet, etc.). As yet another example, if the tone transmission device 105 is a radio, then the tone transmission device 105 may receive tone data in association with a radio signal, transmission, or broadcast via a suitable radio network (e.g., broadcast, satellite, IP television, Internet, etc.). As yet another example, if the tone transmission device 105 is a mobile device, then the tone transmission device 105 may receive tone data via communication over a cellular network or via an Internet connection.

According to an aspect of the invention, the tone transmission device 105 may output a tone for receipt by a mobile device 110. The tone transmission device 105 may output the tone via one or more suitable output devices 128, for example, one or more speakers. In certain embodiments of the invention, the tone management application 126 may direct and/or control the access of stored tone data 125 and the processing of the accessed tone data 125 to derive the tone that is output by the one or more output devices 128. For example, digital tone data 125 may be accessed from memory 122 and processed through a digital-to-analog converter 127 to derive the tone that is output by the one or more output devices 128. In this regard, the stored tone data 125 may be transformed into a tone that may be output by the tone transmission device 105 for receipt by a mobile device. In other embodiments of the invention, the tone transmission device 105 may receive tone data in a broadcast stream, such as a radio or television broadcast stream, and the tone transmission device may output the tone data as a tone in the audio output of the tone transmission device 105. For example, a television broadcast signal may include embedded tone information that is output by one or more speakers of a television as part of the audio output of the received television broadcast signal.

Embodiments of the invention may include tone transmission devices with more or less than the components illustrated for the tone transmission device 105 illustrated in FIG. 1. The description of the tone transmission device 105 of FIG. 1 is provided by way of example only and is not intended to be limiting.

With continued reference to FIG. 1, the mobile device 110 may be any suitable or appropriate device or system that facilitates the receipt of a tone from a tone transmission device 105 and the processing of the received tone. In this regard, the mobile device 110 may receive mobile marketing information through the receipt of one or more tones. The mobile device 110 may facilitate the receipt of tones from any number of tone transmission devices 105 in a wide variety of different locations or environments as desired in various embodiments of the invention. Once a tone is received by the mobile device 110, the tone may be processed by the mobile device 110 to extract information included in the tone, such as, one or more location identifiers that reference additional information associated with the tone. The extracted information may be utilized to access one or more information sources 115 to obtain at least a portion of the additional information associated with the tone.

Tones may be associated with a wide variety of different types of additional information that may be accessed by the mobile device 110 from one or more information sources 115. In one embodiment, additional information that may be associated with tones include, but is not limited to, promotional information, which may optionally include validation information, activation information, and embodiments of actual redeemable promotions for subsequent transmission to a user and/or mobile device. Additionally, information extracted from a tone may facilitate the connection of the mobile device 110 to a website or other network site for a wide variety of purposes, including but not limited, validating a promotion for a given user, activating a promotion for a given user, or generating and/or transmitting a redeemable promotion.

The mobile device 110 may be a processor driven device that facilitates the receipt of tones from tone transmission devices 105 and the processing of the received tones. For example, the mobile device 110 may include any number of special purpose computers or other particular machines, application specific circuits, microcontrollers, and the like. In certain embodiments, at least a portion of the operations of the mobile device 110 may be controlled by computer-executed or computer-implemented instructions that are executed by one or more processors associated with the mobile device 110. The instructions may be embodied in one or more software components as desired in various embodiments of the invention. The execution of the instructions may form a special purpose computer or other particular machine that is operable to receive and process tones. Additionally, in certain embodiments of the invention, the operations and/or control of the mobile device 110 may be distributed amongst several processing components.

The mobile device 110 may include one or more processors 131, one or more memory devices 132, one or more input/output (I/O) interface(s) 133, and one or more network interface(s) 134. The one or more memory devices 132 may be any suitable memory devices, for example, caches, read only memory devices, random access memory devices, magnetic storage devices, etc. The one or more memory devices 132 may store data, executable instructions, and/or various program modules utilized by the mobile device 110, for example, stored tone data 135 that is received by the mobile device 110, an operating system 136, a tone processing application 137, and/or a user profile 138. The stored tone data 135 may include information associated with and/or extracted from one or more tones that are received by the mobile device 110. For example, the stored tone data 135 may include one or more location identifiers that are extracted from received tones. As another example, the stored tone data 135 may include additional information associated with tones that is received from one or more information sources 115.

In certain embodiments of the invention, the mobile device 110 may include one or more software modules, such as an operating system 136 and/or a tone processing application 137. The operating system 136 may control the general operation of the mobile device 110, for example, the completion of telephone calls, the maintenance of an address book, the accessing of the Internet via a mobile browser application, etc. The operating system 136 may also facilitate the execution of other software modules by the one or more processors 131, for example, the tone processing application 137. The tone processing application 137 may include computer-executable instructions that facilitate the receipt and processing of one or more tones by the mobile device 110. For example, the tone processing application 137 may facilitate and/or control the receipt of tones from one or more tone transmission devices 105, the processing of received tones to extract one or more location identifiers associated with the tones, the communication of requests for additional information associated with a tone from one or more information sources 115, the receipt of additional information from one or more information sources 115, the processing of received additional information, the storage of received additional information, and/or the subsequent access and/or processing of stored additional information, such as is described with reference to FIG. 5, for example. In certain embodiments of the invention, the tone processing application 137 may also facilitate and/or control network communication between the mobile device 110 and one or more external devices, such as, one or more information sources 115. Although the tone processing application 137 is illustrated as a single software component, the tone processing application 137 may include any number of software components, modules, and/or applications as desired in various embodiments of the invention.

The user profile 138 may include one or more preferences and/or other information associated with one or more users of the mobile device 110. In certain embodiments, the user profile 138 may include one or more user preferences associated with types of desired tones and/or additional information that may be received and processed by the mobile device 110. For example, the user profile 138 may include preferences indicating that certain tones and/or additional information should be or should not be received and/or processed by the mobile device 110. In this regard, tones and/or additional information may be filtered by the mobile device 110. A wide variety of different preferences and/or criteria may be utilized as desired in various embodiments, including but not limited to, merchant criteria, merchant class or merchant type criteria, broadcaster criteria, marketing source criteria, etc. As another example, the user profile 138 may include one or more preferences associated with the manner in which tones and/or additional information should be processed by the mobile device 110. Moreover, according to one embodiment, the user profile 138 may include information associated with the user of the mobile device 110, such as, but not limited to, name information, username, account information, billing information, and the like.

The one or more I/O interfaces 133 may facilitate communication between the mobile device 110 and one or more input/output devices, for example, one or more user interface devices, such as, a display, keypad, control panel, touch screen display, remote control, microphone, etc. that facilitate user interaction with the mobile device 110. In this regard, one or more user preferences associated with the operation of the mobile device 110 may be received and processed.

The one or more network interfaces 134 may facilitate connection of the mobile device 110 to one or more suitable networks 140, for example, a cellular network, a local area network, a Bluetooth enabled network, a Wi-Fi network, a radio frequency network, a wide area network, the Internet, any wired network, any wireless network, etc. In this regard, the mobile device 110 may receive additional information or data associated with tones from one or more external devices, network components, and/or systems via the one or more networks 140. The mobile device 110 may then process the received additional information and communicate with the one or more external devices, network components, and/or systems via the one or more networks 140. For example, the mobile device 110 may receive a tone from a tone transmission device 105 and extract one or more location identifiers from the received tone. The mobile device 110 may utilize the one or more extracted location identifiers to access one or more information sources 115 via a cellular network or mobile Internet browser and receive additional information associated with the tone. The mobile device 110 may utilize a wide variety of different techniques, methods, and/or systems to communicate with the one or more information sources 115. For example, a mobile Internet browser or other specific purpose or dedicated application may facilitate communication between the mobile device 110 and the one or more information sources 115. As another example, short message service (SMS) communications may be utilized to facilitate communication between the mobile device 110 and the one or more information sources 115.

According to an aspect of the invention, the mobile device 110 may receive and process one or more tones from any number of tone transmission devices 105. A tone may be output by a tone transmission device 105 and the mobile device 110 may identify and receive the output tone within a predetermined distance or range "d" from the tone transmission device 105. A tone transmission device 105 may have a wide variety of different ranges as desired in various embodiments of the invention, for example, a range of approximately three feet. In certain embodiments of the invention, the tone processing application 137 of the mobile device 110 may control the receipt of tones by the mobile device 110. For example, a setting or option associated with the tone processing application 137 may control the receipt of tones by the mobile device 110. When a user indicates that the setting or option should be set to allow tones to be received, the receipt of tones may be facilitated by the mobile device 110. However, when a user indicates that the setting or option should be set to disallow the receipt of tones, then the mobile device 110 will not process any tones output by a tone transmission device 105. In some embodiments, tones may be received and processed when a user of the mobile device opens, executes, or leaves on the tone processing application 137. In other embodiments, tones may be received and processed only when a user selects an option within the tone processing application 137 indicating that tones should be received.

The mobile device 110 may include one or more input devices that facilitate the receipt of tones. For example, a microphone 141 associated with the mobile device 110 may be utilized to receive tones that have been output by one or more speakers associated with a tone transmission device 105. After being received by the microphone 141, a tone may be passed through one or more filters, for example, one or more band pass filters that facilitate the isolation of the tone from other transmissions received by the microphone 141. The filtered tone may then be passed through one or more analog-to-digital converters 143 prior to being communicated to the one or more processors 131. In this regard, an analog tone may be transformed into digital information that may be processed by the tone processing application 137. The tone processing application may 137 process the digital information associated with the tone, and the tone processing application 137 may extract one or more location identifiers and/or other data associated with the tone. In certain embodiments of the invention, the tone processing application 137 may further filter the received digital information with one or more digital filters or software filters.

Once the one or more location identifiers have been extracted by the tone processing application 137, the tone processing application 137 may utilize the one or more location identifiers to receive additional information associated with the tone, for example, promotional information and/or activation confirmations or redeemable promotions. The one or more location identifiers may facilitate the identification of one or more information sources 115 from which the additional information associated with the tone may be received. The tone processing application 137 may direct the communication of a request for the additional information to at least one information source 115 via a suitable network 140. The request may include at least one location identifier and/or an identifier of the mobile device 110, for example, a telephone number associated with the mobile device 110, a universal integrated circuit card (UICC) identifier, a unique device identifier (UDID), a subscriber identity module (SIM) card identifier, an international mobile subscriber identity (IMSI) number associated with the mobile device 110, or any other identifier that facilitates communication with an information source (e.g., a back-end processor Mobile Gateway identifier). Responsive to the request, the mobile device 110 may receive the requested additional information associated with the tone via the network 140. The tone processing application 137 may process at least a portion of the received additional information. Additionally, the tone processing application 137 may direct the storage of the one or more location identifiers and/or the received additional information in the memory 132 of the mobile device 110. As desired, at least a portion of the received additional information may be presented or output to a user of the mobile device 110 via one or more suitable output devices associated with the mobile device 110, for example, a display, speaker, headset, or an output device external to the mobile device 110.

Additional information associated with a tone may be utilized by a mobile device 110 for a wide variety of different purposes as desired in various embodiments of the invention. For example, additional information may include general promotional information, such as may be beneficial to the consumer to describe the promotion, activation confirmation (or rejection), such as may indicate whether the promotion is valid for the user and/or at the given time, location, etc., or a redeemable promotion that can be presented during a transaction to redeem in accordance with the promotion terms. At least a portion of the additional information may be formatted for and displayed to a user of the mobile device 110 via a suitable output device associated with the mobile device 110 (e.g., an LCD display). As another example, additional information may facilitate the display of an actual redeemable promotion on an output device associated with the mobile device 110, such as is described with reference to FIG. 9. User input associated with the promotional information may also be received and processed. In other embodiments, the additional information may be stored by the mobile device 110 and utilized in a subsequent transaction associated with the respective program. For example, the additional information may include an account or membership number, and the number or other identifier may be accessed from memory by the mobile device 110 at a point of sale terminal. The number or other identifier may be displayed on a display of the mobile device, scanned from the display at the point of sale terminal, communicated from the mobile device 110 to the point of sale terminal via a suitable network connection, or communicated to an intermediary device that interacts with the point of sale terminal, such as, a contactless transaction device associated with the mobile device 110.

Embodiments of the invention may include mobile devices 110 with more or less than the components illustrated for the mobile device 110 illustrated in FIG. 1. The description of the mobile device 110 of FIG. 1 is provided by way of example only and is not intended to be limiting.

With continued reference to FIG. 1, the system 100 may include any number of information sources 115 that are operable to provide additional information associated with tones to a mobile device. The additional information may be communicated to a mobile device 110 by an information source 115 in response to a request for the additional information, as discussed in greater detail above. In certain embodiments of the invention, a mobile device 110 may communicate requests directly to any number of information sources 115. In other embodiments, the mobile device 110 may communicate requests to a single information source or a central information source. The central information source may communicate with other information sources as desired in various embodiments of the invention and collect additional information that is communicated to the mobile device 110. Additionally or alternatively, the central information source may establish direct communication between the mobile device 110 and another information source, for example, via handing off a network session between the mobile device 110 and the central information source to another information source.

An information source 115 may be a processor driven device or network entity that facilitates the receipt of a request for additional information or data associated with a tone, the accessing of the additional information, and the communication of the additional information to another component of the system 100 in response to the received request for the additional information. For example, the additional information may be communicated to the mobile device 110 or to another information source 115 in response to a request for the additional information. The information source 115 may include any number of processors and/or processing components as desired in various embodiments of the invention. For example, the information source 115 may include any number of special purpose computers or other particular machines, application specific circuits, microcontrollers, personal computers, servers, and the like. In certain embodiments, at least a portion of the operations of the information source 115 may be controlled by computer-executed or computer-implemented instructions that are executed by one or more processors associated with the information source 115. The instructions may be embodied in one or more software components as desired in various embodiments of the invention. The execution of the instructions may form a special purpose computer or other particular machine that is operable to receive and process requests for additional information associated with tones. Additionally, in certain embodiments of the invention, the operations and/or control of the information source 115 may be distributed amongst several processing components.

The information source 115 may include one or more processors 151, one or more memory devices 152, one or more input/output (I/O) interface(s) 153, and one or more network interface(s) 154. The one or more memory devices 152 may be any suitable memory devices, for example, caches, read only memory devices, random access memory devices, magnetic storage devices, databases, etc. The one or more memory devices 152 may store data, executable instructions, and/or various program modules utilized by the information source 115, for example, additional information 155 associated with tones, an operating system 156, and/or a promotional information processing module 157. The stored additional data 155 may include any information associated with a tone that may be received by a mobile device 110. For example, the stored additional data 155 may include marketing information associated with a tone.

In certain embodiments of the invention, the information source 115 may include one or more software modules, such as an operating system 156 and/or a promotional information processing module 157. The operating system 156 may control the general operation of the information source 115 and may facilitate the execution of other software modules by the one or more processors 151, for example, the execution of the promotional information processing module 157. The promotional information processing module 157 may include computer-executable instructions that facilitate the receipt and processing of one or more requests for additional information associated with tones. For example, the promotional information processing module 157 may facilitate and/or control the receipt, from one or more mobile devices 110 and/or other information sources, of requests for additional information associated with tones, the processing of the received requests to access the additional information, and the communication of the additional information to the requesting entity, such as is described with reference to FIGS. 5-7, for example. Additionally, the promotional information processing module 157 may facilitate and/or control network communication between the information source 115 and one or more external devices, such as, a mobile device 110 and/or other information sources. Although the promotional information processing module 157 is illustrated as a single software component, the promotional information processing module 157 may include any number of software components, modules, and/or applications as desired in various embodiments of the invention.

A request for additional information associated with a tone may include one or more location or other unique identifiers that have been extracted from the tone by the mobile device 110. Additionally, the request may include an identifier of the mobile device 110. The promotional information processing module 157 may receive the request and process the request to extract the one or more location identifiers and/or the identifier of the mobile device 110. In other words, the received request may be transformed by the promotional information processing module 157 into data that is representative of the one or more location identifiers and/or the identifier of the mobile device 110. The one or more location identifiers may be utilized to access additional information associated with a tone. For example, a location identifier may be utilized to search for additional information associated with a tone that is stored in a memory 152 of the information source. In certain embodiments, a location identifier may function as a pointer to stored additional information. As another example, a location identifier may be utilized in the generation of a request for additional information that is communicated to another information source, such as a third party information source. One or more location identifiers may reference other information sources and/or memory locations associated with the other information sources. The promotional information processing module 157 may generate a request for additional information and communicate the request to the other information sources. The request may be processed by a host module of the other information sources and the requested additional information may be communicated to the requesting promotional information processing module 157. Once the additional information has been obtained by the promotional information processing module 157, at least a portion of the additional information may be communicated by the promotional information processing module 157 to the mobile device 110 via one or more suitable networks 140.

The one or more I/O interfaces 153 may facilitate communication between the information source 115 and one or more input/output devices, for example, a keyboard, mouse, display, keypad, control panel, touch screen display, remote control, microphone, disc drive, CD-ROM drive, infrared receiver, a device connected via a universal serial bus (USB) port, a device connected via a serial port, etc. In this regard, input associated with the operation of the information source 115 be received and information processed by the information source 115 may be output.

The one or more network interfaces 154 may facilitate connection of the information source 115 to one or more suitable networks 140, for example, a cellular network, a local area network, a wide area network, the Internet, a Bluetooth enabled network, a Wi-Fi network, a radio frequency network, any wired network, any wireless network, etc. In this regard, the information source 115 may receive requests for additional information and may communicate additional information associated with tones to a requesting mobile device 110. Additionally, the information source 115 may communicate with other information sources as desired. The information source 115 may utilize a wide variety of different techniques, methods, and/or systems to communicate with a mobile device 110 and/or with other information sources. For example, a web server or other specific purpose or dedicated application may facilitate communication between the information source 115 and the mobile device 110. As another example, short message service (SMS) communications may be utilized to facilitate communication between the information source 115 and the mobile device 110.

Embodiments of the invention may include information sources 115 with more or less than the components illustrated for the information source 115 illustrated in FIG. 1. The description of the information source 115 of FIG. 1 is provided by way of example only and is not intended to be limiting.

In certain embodiments of the invention, at least a portion of the additional information associated with a tone may be stored by a mobile device 110 prior to the receipt of the tone by the mobile device 110. The tone processing application 137 of the mobile device may process the received tone to extract one or more location identifiers, and the one or more extracted location identifiers may be utilized to access at least a portion of the prestored additional information. As one example, additional promotional information associated with a given promotion may be prestored in the memory 132 of the mobile device 110 prior to a user of the mobile device 110 visiting a retail outlet associated with the promotion. The additional information may be received by and prestored on the mobile device 110 utilizing a wide variety of different techniques or methods as desired. For example, the additional information may be received from an information source via one or more suitable networks, for example, a Bluetooth enabled network, a Wi-Fi network, an RFID network, cellular network, Internet connection, etc. The receipt, storage, subsequent access, and/or subsequent processing of the additional information may be managed by the tone processing application 137 in certain embodiments of invention. In this example, a user may be provided with additional promotional information about that is prestored on the mobile device 110, such as when encountering one or more tone transmission devices 105, for example, when shopping at a retail outlet or when watching television content.

With continued reference to FIG. 1, the system 100 may include any number of data sources 120 that are operable to communicate or otherwise provide tone data to the tone transmission device 105. In certain embodiments of the invention, a data source 120 may communicate tone data to the tone transmission device 105 via one or more suitable networks 130. Tone data may be communicated to a tone transmission device 105 in response to the receipt, from the tone transmission device 105, of a request for the tone data. Alternatively, a data source 120 may push or otherwise communicate tone data to the transmission device 105 without the tone data being requested. For example, in a merchant location, a data source 120 may push tone data associated with a product to a tone transmission device 105 situated proximate to the product. As another example, a data source 120 may include a broadcasting entity that incorporates tone data into broadcast information, such as a radio or television broadcast, that is communicated to a radio or television that functions as a tone transmission device, such as is described with reference to FIG. 3. According to one example embodiment, the data source 120 can a component of an information source 115, or otherwise associated with a same entity as an information source 115, such as a back-end processor facilitating communications associated with information carrying tones and promotion management.

A data source 120 may be a processor driven device or network entity that facilitates the communication tone data to another component of the system 100, for example, a tone transmission device 105 or another data source 105. The data source 120 may include any number of processors and/or processing components as desired in various embodiments of the invention. For example, the data source 120 may include any number of special purpose computers or other particular machines, application specific circuits, microcontrollers, personal computers, servers, and the like. In certain embodiments, at least a portion of the operations of the data source 120 may be controlled by computer-executed or computer-implemented instructions that are executed by one or more processors associated with the data source 120. The instructions may be embodied in one or more software components as desired in various embodiments of the invention. The execution of the instructions may form a special purpose computer or other particular machine that is operable to communicate tone data. Additionally, in certain embodiments of the invention, the operations and/or control of the data source 120 may be distributed amongst several processing components.

The data source 120 may include one or more processors 161, one or more memory devices 162, one or more input/output (I/O) interface(s) 163, and one or more network interface(s) 164. The one or more memory devices 162 may be any suitable memory devices, for example, caches, read only memory devices, random access memory devices, magnetic storage devices, databases, etc. The one or more memory devices 162 may store data, executable instructions, and/or various program modules utilized by the data source 120, for example, tone data 165 associated with tones, an operating system 166, and/or a host module 167. The stored tone data 165 may include stored data associated with a tone that is communicated to a tone transmission device 105 for output by the tone transmission device 105. For example, the stored tone data 165 may include stored digital data associated with a tone, such as, a WAV file, MP3 file, MPEG file, AIFF file, AAC file, Apple Lossless file, or other digital media file format.

In certain embodiments of the invention, the data source 120 may include one or more software modules, such as an operating system 166 and/or a host module 167. The operating system 166 may control the general operation of the data source 120 and may facilitate the execution of other software modules by the one or more processors 161, for example, the execution of the host module 167. The host module 167 may include computer-executable instructions that facilitate the communication of tone data 165 to a tone transmission device 105. For example, the host module 167 may facilitate and/or control the receipt, from a tone transmission device 105, of a request for tone data 165, the processing of the received requests to access the tone data 165, and/or the communication of tone data 165 to the tone transmission device 105. As another example, the host module 167 may facilitate the establishment of a network session or other communication with the tone transmission device 105, and the host module 167 may direct the communication or transmission of tone data 165 to the tone transmission device 105. The host module 167 may also facilitate and/or control network communication between the data source 120 and one or more other data sources. Although the host module 167 is illustrated as a single software component, the host module 167 may include any number of software components, modules, and/or applications as desired in various embodiments of the invention.

The one or more I/O interfaces 163 may facilitate communication between the data source 120 and one or more input/output devices, for example, a keyboard, mouse, display, keypad, control panel, touch screen display, remote control, microphone, disc drive, CD-ROM drive, infrared receiver, a device connected via a universal serial bus (USB) port, a device connected via a serial port, etc. In this regard, input associated with the operation of the data source 120 may be received and information processed by the data source 120 may be output.

The one or more network interfaces 164 may facilitate connection of the data source 120 to one or more suitable networks 130, for example, a local area network, a wide area network, the Internet, a cellular network, a Bluetooth enabled network, a Wi-Fi network, a radio frequency network, a television broadcast network, a television cable network, a television satellite network, a radio broadcast network, any wired network, any wireless network, etc. In this regard, the data source 120 may communicate tone data 125 to a tone transmission device 105. Additionally, the data source 120 may communicate with other data sources as desired in various embodiments of the invention. For example, a first data source 120 may receive tone data 125 from a second data source 120, and the first data source 120 may communicate the received tone data 125 to the tone transmission device 105.

Embodiments of the invention may include data sources 120 with more or less than the components illustrated for the data source 120 illustrated in FIG. 1. The description of the data source 120 of FIG. 1 is provided by way of example only and is not intended to be limiting. Additionally, in certain embodiments, a data source 120 and an information source 115 may be the same device or system.

Although FIG. 1 has been described as having specific functions performed by specific components of the system 100, various functions and/or operations of embodiments of the invention may be performed by any suitable component of the system 100. In certain embodiments, various functions and/or operations that are described as being performed by multiple components may be performed by a single component of the system 100. For example, a tone transmission device 105 may also function as an information source 115. Additionally, various operations may be completed in a distributed manner by multiple components of the system 100.

Additionally, certain components of the system 100 are described as having any number of processors or processing components. Operations may be completed by the one or more processors as desired in various embodiments of the invention. A different processor may be provided to complete or facilitate each operation of a system component, or alternatively, multiple operations may be completed or facilitated by a single processor. For example, a first processor of the mobile device 110 may facilitate the processing of a received tone to extract one or more location identifiers associated with the tone; a second processor may facilitate the storage of the extracted one or more location identifiers; a third processor may facilitate the communication of a request for additional information associated with the tone to one or more information sources; and a fourth processor may facilitate the receipt of the requested additional information from the one or more information sources. As desired, two or more of the first, second, third, and fourth processors may be the same processor. Although the example above relates to the operations of the mobile device 110, the operations of other components of the system 100 may be completed and/or facilitated in a similar manner.

FIG. 2 is a diagram of one example data flow 200 of transmitting an information carrying tone and retrieving information associated with the tone, according to an illustrative embodiment of the invention. The data flow 200 may be applicable to a wide variety of systems utilized to communicate tones to a mobile device, including but not limited to, the system 100 illustrated in FIG. 1.

With reference to FIG. 2, a tone data source 205 may communicate an information carrying tone 210 to a tone transmission device 215. The tone transmission device 215 may include any device that is capable of communicating or outputting the tone 210 to the mobile device 220, such as any tone transmission device 105 described with reference to FIG. 1, for example. The tone data source 205 may include any device or number of devices that are capable of communicating a tone 210 or information associated with a tone to the tone transmission device 215, such as any tone data source 120 describe with reference to FIG. 1, for example. In various embodiments of the invention, the tone data source 205 may communicate a tone 210 or information associated with a tone to the tone transmission device 215 in response to a request that is received from the tone transmission device 215. In other embodiments of the invention, the tone data source 205 may proactively push the tone 210 or information associated with a tone to the tone transmission device 215 via a suitable network. In still other embodiments of the invention, the tone data source 205 may output one or more tones via one or more suitable output devices, such as one or more speakers, and the one or more tones, may be received and processed by the tone transmission device 215. The one or more tones output by the tone data source 205 may include the tone 210 and/or information associated with the tone 210.

Although FIG. 2 illustrates the tone data source 205 as communicating a tone 210 to the tone transmission device 215, in various embodiments of the invention, the tone data source 205 may communicate information associated with the tone 210 to the tone transmission device 215, and the tone transmission device 215 may utilize a portion or all of the received information to generate the tone 210 that is to be output by the tone transmission device 215.

Additionally, in various embodiments of the invention, the tone 210 and/or information associated with the tone 210 may be stored by the tone transmission device 215 in one or more suitable memory devices 216, for example, one or more caches, read only memory devices, random access memory devices, magnetic storage devices, etc. In certain embodiments, the tone 210 or information associated with the tone 210 may be accessed from the one or more memory devices 216 and output by the tone transmission device 215. Additionally, in certain embodiments, information associated with the tone 210 may be utilized by the tone transmission device 215 to generate the tone 210 to be output.

In certain embodiments of the invention, the tone 210 may be communicated from the tone transmission device 215 to the mobile device 220 by being output from one or more suitable output devices associated with the tone transmission device 215, for example, one or more speakers. In certain embodiments, the tone 210 may be output by the tone transmission device 215 in response to a request that is received from the mobile device 220. In other embodiments, the tone 210 may be proactively output by the tone transmission device 215 for reception by the mobile device 220. For example, the tone 210 may be periodically output by the tone transmission device 215 at regular time intervals, such as, every 5 seconds, every 10 seconds, every 15 seconds, etc. As another example, the tone 210 may be continuously output by the tone transmission device 215 in a loop. In other embodiments of the invention, the tone 210 may be output by the tone transmission device 215 based upon the receipt of user input to output the tone 210.

After being output by the tone transmission device 215, the tone 210 may be received by the mobile device 220. According to an aspect of the invention, the tone 210 may be received by a microphone associated with the mobile device 220. After being received by a microphone, the tone 210 may be processed through one or more filters (e.g., band pass filters) as desired and converted into digital data utilizing an analog-to-digital converter. The digital data from the tone 210 may be processed by one or more appropriate software modules and/or software applications associated with the mobile device 220, for example, the tone processing application 137 as described above with reference to FIG. 1. One or more location identifiers may be extracted from the digital data by the mobile device 220. Additionally, as desired in various embodiments of the invention, the received tone 210, digital data and/or the one or more extracted location identifiers may be stored in one or more suitable memory devices 221 associated with the mobile device 220, for example, one or more caches, read only memory devices, random access memory devices, etc.

The mobile device 220 may utilize the one or more extracted location identifiers to request additional information associated with the tone 210 from one or more information sources 230, such as is further described with reference to FIG. 5, for example. The mobile device 220 may generate a request 225 for additional information associated with the tone 210, and the mobile device 220 may communicate the request 225 to one or more information sources 230. The request 225 may include one or more of the extracted one or more location identifiers and an identifier of the mobile device 220, for example, a universal integrated circuit card (UICC) identifier, a unique device identifier (UDID), a subscriber identity module (SIM) card identifier, an international mobile subscriber identity (IMSI) number associated with the mobile device 220, or any other identifier that facilitates communication with an information source (e.g., a First Data Mobile Gateway identifier). In certain embodiments, the mobile device 220 may communicate with a central information source 230 when requesting additional information associated with a tone 210. In certain other embodiments, one or more of the location identifiers may identify one or more information sources that the mobile device 220 will communicate with in order to request additional information associated with a tone 210. In other embodiments, the mobile device 220 may initially communicate with a central information source 230 and a communication session may be passed off by the central information source 230 to another information source. In yet other embodiments, the mobile device 220 may initially communicate with a central information source 230 and the central information source 230 may establish communication sessions between the mobile device 220 and one or more other information sources. FIG. 2 illustrates the mobile device 220 communicating with a single information source 230 to request additional information associated with a tone 210; however, the mobile device 220 may communicate with any number of information sources 230, 240 as desired in other embodiments of the invention.

The request 225 for additional information associated with a tone 210 may be communicated from a mobile device 220 to an information source 230 via one or more suitable networks, for example, a cellular network, a local area network, a wide area network, the Internet, a Bluetooth network or network connection, a Wi-Fi network or network connection, a radio frequency network or network connection, any wired network, any wireless network, etc. The request 225 may be received and processed by the information source 230. The information source 230 may utilize one or more of the location identifiers to access additional information 235 associated with the tone 210 from any number of suitable memory devices 231 associated with the information source, for example, caches, read only memory devices, random access memory devices, magnetic storage devices, databases, etc., such as is further described with reference to FIGS. 6-7, for example.

Additionally, in certain embodiments of the invention, the information source 230 may communicate a request 245 for additional information associated with the tone 210 to one or more third party information sources 240, such as is further described with reference to FIG. 7, for example. The one or more third party information sources 240 may be identified by the information source 230 from one or more of the location identifiers extracted from the tone 210 by the mobile device 220. The request 245 that is communicated to the one or more third party information sources 240 may include one or more location identifiers extracted from the tone 210 and/or an identifier of the information source 240. Communication between the information source 230 and the one or more third party information sources 240 may be facilitated via one or more suitable networks, for example, a local area network, a wide area network, the Internet, a Bluetooth enabled network, a Wi-Fi network, a radio frequency network, any wired network, any wireless network, etc.

A third party information source 240 may receive and process a request 245 for additional information from the information source 230. The third party information source 240 may utilize one or more of the location identifiers to access additional information 250 associated with the tone 210 from any number of suitable memory devices 241 associated with the third party information source 240, for example, caches, read only memory devices, random access memory devices, magnetic storage devices, databases, etc. The third party information source 240 may then communicate the accessed additional information 250 to the information source 230 via the one or more suitable networks in response to the request 245. The information source 230 may receive the additional information 250 from the third party information source 240. In some embodiments, additional information 250 may be received by the information source 230 from multiple third party information sources 240, and the information source 230 may combine the received additional information 250 to generate the additional information 235 that will be communicated to the mobile device 220. Additionally, as desired in various embodiments, additional information 250 received from third party information sources 240 may be combined with additional information accessed by the information source 230. When combining information received and/or accessed from various sources, the information source 230 may extract duplicate information and/or resolve conflicts between conflicting information as desired in various embodiments. In this regard, the additional information 235 to be communicated to the mobile device 220 may be formatted for communication to the mobile device 220.

Once the additional information 235 associated with the tone 210 has been accessed and/or received by the information source 230, the information source 230 may communicate the additional information 235 to the mobile device 220 in response to the request 225 for additional information that was received from the mobile device 220. In certain embodiments, the information source 230 may store various data associated with a request for additional information 235 that is received from the mobile device 220. For example, the information source 230 may store an indication that the mobile device 220 requested the additional information 235 and/or an indication that the additional information 235 was communicated to the mobile device 220. In this regard, tone activity for a user of the mobile device 220 may be tracked by the information source 230.

Additionally, as desired in various embodiments, the mobile device 220 may display at least a portion of the additional information to a user of the mobile device 220 via one or more suitable output devices, for example, a display. As an example, promotional information, such as promotion terms, activation confirmations, or redeemable promotions, associated with the tone 210 may be displayed to the user. In certain embodiments, the mobile device 220 may utilize at least a portion of the additional information 235 to communicate with another entity. For example, the additional information 235 may include a link, such as a hyperlink, that facilitates the establishment of communication between the mobile device 220 and another entity, such as, an information source 220, 240, or another entity, system, or device associated with the tone 210. In this regard, the mobile device 210 may be utilized to access other information associated with the tone 210, for example, a web site that includes additional promotional information.

Many variations may be made to the data flow 200 illustrated in FIG. 2 as desired in various embodiments of the invention. The data flow 200 is not intended to be limiting, but instead is provided by way of example only as an illustrative embodiment of the invention.

Illustrative tone transmission device receiving a broadcast signal

FIG. 3 is a schematic diagram of an example system 300 that may facilitate the communication of information to a mobile device 315 via a tone transmission device 310 operable to communicate a broadcast signal, such as a television or radio signal, according to an illustrative embodiment of the invention. Accordingly, the system of FIG. 3 may facilitate the communication of one or more information carrying tones to a tone transmission device 310 via a broadcast signal, for example, a radio or television broadcast.

With reference to FIG. 3, the system 300 may include a broadcast entity 305, a tone transmission device 310, and a mobile device 315. The broadcast entity 305 may be operable to generate a broadcast signal or a broadcast stream that is communicated directly and/or indirectly to any number of tone transmission devices 310. Examples of broadcast companies include, but are not limited to, television networks, television broadcast companies, radio stations, etc. Examples of broadcast signals include, but are not limited to, television broadcast signals, radio broadcast signals, Internet content, etc.

The tone transmission device 310 according to this embodiment may be any suitable device that is operable to receive a broadcast signal and output at least a portion of the received broadcast signal to one or more users. Examples of tone transmission devices 310 include, but are not limited to, televisions, radios, television antennas, cable boxes, satellite television receivers, satellite radios, any combination of these devices (e.g., a television and a cable box), etc.

As desired in various embodiments of the invention, one or more tones may be included in a broadcast signal that is received by a tone transmission device 310. The tone transmission device 310 may receive the one or more tones in a broadcast signal and output the one or more received tones with the broadcast signal. The one or more received tones may be communicated by the tone transmission device 310 to a mobile device 315. For example, one or more suitable output devices 320, such as one or more speakers associated with the tone transmission device 310, may be utilized to output the one or more tones. The one or more tones may then be received by one or more input devices 325, such as a microphone, associated with the mobile device 315. In this regard, one or more tones included in a broadcast signal may be communicated to a mobile device 325, and the mobile device 325 may process the one or more received tones to extract one or more location identifiers that are utilized to gather additional information associated with the one or more tones, such as is described with reference to FIGS. 6-7, for example.

In certain embodiments of the invention, a broadcast entity 305 may communicate a broadcast signal directly to a tone transmission device 310. For example, a broadcast entity 305 may utilize one or more transmission towers 330 to transmit or otherwise communicate audio and/or video signals that may be directly received by the tone transmission device 310 and/or equipment associated with the tone transmission device 310, for example, an antenna associated with the tone transmission device 310.

In other embodiments of the invention, a broadcast entity 305 may communicate a broadcast signal to one or more intermediary systems and/or service providers 335, 340, 345, 350. The one or more intermediary systems and/or service providers 335, 340, 345, 350 may receive the broadcast signal from the broadcast entity 305 and communicate the broadcast signal to the tone transmission device 310. A wide variety of techniques and/or systems may be utilized as desired to communicate the broadcast signal from the broadcast entity 305 to an intermediary system or service provider 335, 340, 345, 350. For example, the broadcast entity 305 may communicate a broadcast signal to an intermediary system 335, 340, 345, 350 via one or more satellites 355 and/or satellite communications systems, such as, the EchoStar Technologies™ satellite communications system. As another example, the broadcast entity 305 may communicate a broadcast signal to an intermediary system 335, 340, 345, 350 via one or more suitable networks 360, such as, a fiber optic network, a cable network, an IP television network, the Internet, a wide area network, any suitable wired network, and/or any suitable wireless network. As yet another example, the broadcast entity 305 may utilize one or more transmission towers 330 to transmit or otherwise communicate the broadcast signal to an intermediary system 335, 340, 345, 350.

Any number of intermediary systems and/or service providers 335, 340, 345, 350 may be utilized as desired in various embodiments of the invention. An intermediary system 335, 340, 345, 350 may receive a broadcast signal from a broadcast entity 305 or from another intermediary system 335, 340, 345, 350 as desired in various embodiments. The intermediary system 335, 340, 345, 350 may then communicate the received broadcast signal to the tone transmission device 310 or to another intermediary system 335, 340, 345, 350. For purposes describing example intermediary systems 335, 340, 345, 350, the intermediary systems 335, 340, 345, 350 will be described as receiving a broadcast signal from a broadcast entity 305 and communicating the received broadcast signal to a tone transmission device 310. Examples of intermediary systems and/or service providers include, but are not limited to, a satellite provider 335, a cable provider 340, a local provider 345, and an internet service provider 350.

A satellite provider 335 may receive a broadcast signal from the broadcast entity 305 and transmit or otherwise communicate at least a portion of the broadcast signal to the tone transmission device 310 via one or more suitable satellites 365 and/or satellite communications systems, for example, a satellite television communications system or a satellite radio communications system. Similarly, a cable provider 340 may receive a broadcast signal from the broadcast entity 305 and transmit or otherwise communicate at least a portion of the broadcast signal to the tone transmission device 310 via one or more suitable cable networks 370. Similarly, a local provider 345 may receive a broadcast signal from the broadcast entity 305 and transmit or otherwise communicate at least a portion of the broadcast signal to the tone transmission device 310 via one or more suitable transmission towers 375. Similarly, an internet service provider (ISP) 350 may receive a broadcast signal from the broadcast entity 305 and transmit or otherwise communicate at least a portion of the broadcast signal to the tone transmission device 310 via one or more suitable Internet connections, for example, a wide area network, etc.

As desired in various embodiments of the invention, one or more information carrying tones may be incorporated into or included in the broadcast signal that is received by the tone transmission device 310. The one or more tones may be incorporated into the broadcast signal by the broadcast entity 305 and/or by one or more intermediary systems 335, 340, 345, 350. For example, the broadcast entity 305 may insert, layer, embed, or otherwise incorporate one or more tones into a broadcast stream prior to or during the communication of the broadcast stream to a tone transmission device 310 or to an intermediary system 335, 340, 345, 350. The one or more tones may relate to, for example, marketing programs or services that are advertised via the broadcast stream (e.g., television or radio advertisement), programs included in the broadcast stream (e.g., television shows, movies, radio shows), etc. The incorporation of a tone into the broadcast stream may include the insertion of the tone into the broadcast stream utilizing a wide variety of different techniques and/or methods, for example, modulation, the insertion of a digital packet of information that includes the tone, the transmission of the tone in a separate channel or carrier signal, etc. Additionally, as desired in various embodiments of the invention, a tone may be incorporated into the broadcast stream as either an analog signal or as digital information.

With continued reference to FIG. 3, the system 300 may include one or more tone data sources 385. Each tone data source 385 may be operable to communicate or otherwise provide one or more tones and/or data associated with the generation of one or more tones to the broadcast entity 305 and/or an intermediary system 335, 340, 345, 350. In certain embodiments of the invention, a tone data source 385 may communicate tones and/or tone data to the broadcast entity 305 and/or an intermediary system 335, 340, 345, 350 via one or more suitable networks 360, for example, a local area network, a wide area network, the Internet, a telephone network, a broadcast network, a cellular network, any wired network, any wireless network, etc. In this regard, the broadcast entity 305 and/or an intermediary system 335, 340, 345, 350 may receive tones that are inserted into a broadcast signal and/or information that may be utilized to generate tones that are inserted into a broadcast signal. Tones and/or tone data may be communicated to the broadcast entity 305 and/or an intermediary system 335, 340, 345, 350 in response to the receipt of a request for the tones and/or tone data. Alternatively, a data source 385 may push or otherwise communicate tones and/or tone data to the broadcast entity 305 and/or an intermediary system 335, 340, 345, 350 without the tones and/or tone data being requested. Each tone data source 385 may be a suitable processor driven device with components that are similar to the tone data sources 120 described above with reference to FIG. 1 and the tone data sources 210 described above with reference to FIG. 2. According to one example embodiment, the data source 385 can a component of an information source, such as is described with reference to FIGS. 1-2, or otherwise associated with a same entity as an information source, such as a back-end processor facilitating communications associated with information carrying tones and promotion management.

Once the broadcast stream is received by the tone transmission device 310, the tone transmission device 310 may process and output at least a portion of the received broadcast stream via one or more suitable output devices 320, for example, one or more displays and/or speakers associated with the tone transmission device 310. A wide variety of tone transmission devices 310 may be utilized as desired in various embodiments of the invention, for example, a radio, television, projector, computer, etc. In certain embodiments of the invention, the broadcast stream may be processed and output in real time or near real time as it is received by the tone transmission device 310. In other embodiments of the invention, at least a portion of the broadcast stream may be stored in one or more suitable memory devices associated with the tone transmission device 310 (e.g., a digital video recorder), and the stored portion of the broadcast stream may be accessed from memory, processed, and/or output at a subsequent point in time.

During the outputting of the broadcast stream by the tone transmission device 310, one or more tones included in the broadcast stream may be output. A mobile device 315 that is within a predetermined distance or range "d" from the tone transmission device 310 may be utilized to receive the one or more tones that are output. The mobile device 315 may process one or more received tones in order to extract one or more location identifiers that are utilized to request and receive additional information associated with the one or more tones. In this regard, additional information associated with a broadcast stream, for example, promotional information, such as promotion terms, activation confirmations, or redeemable promotions, may be received by a mobile device 315 and presented to a user of the mobile device.

Illustrative Information Carrying Tone

FIG. 4 illustrates a block diagram of data that may be included in an example information carrying tone, according to an illustrative embodiment of the invention.

With reference to FIG. 4, an information carrying tone 400 may include a header portion 405, a data portion 410, and/or a check sum portion 415, according to one embodiment. The header portion 405 may include, for example, information that identifies the tone 400 and the information and/or data that is included in the tone 400. The data portion 410 may include a data payload, for example, one or more location identifiers, that may be extracted from the tone 400 by a mobile device. Any number of location identifiers may be included in the data portion 410 as desired in various embodiments of the invention. Additionally, content identifiers 420 and/or information source identifiers 425 may be included in the data portion 410 as desired. A content identifier 420 may identify, reference, or point to a memory location or block of memory at which additional information associated with the tone 400 is stored at an information source. An information source identifier 425 may identify, reference, or point to an information source at which additional information associated with the tone 400 is stored. Any other data may be included in the data portion 410 of the tone 400, according various embodiments. The check sum portion 415 may include suitable information and/or data that may be utilized by a receiving mobile device to verify that the tone 400 has been properly received.

The tone 400 described with reference to FIG. 4 illustrates one example of the information or data that may be included in a tone 400 that is utilized in various embodiments of the invention, as further described herein. A wide variety of other information and/or information formats may be utilized to form a tone as desired in various embodiments of the invention. The tone 400 of FIG. 4 is provided by way of example only and is not intended to be limiting.

Additionally, when a tone is output to a mobile device by a tone transmission device, the tone may be output as an analog signal. In certain embodiments of the invention, analog data for a tone may be received or accessed from memory by a tone transmission device, and the analog data may be output for receipt by a mobile device. In other embodiments of the invention, digital data for a tone may be received or accessed from memory by a tone transmission device, and the digital data may be transformed into analog data and output for receipt by a mobile device. A tone may be output utilizing a wide variety of signals as desired in various embodiments of the invention. For example, in certain embodiments, the information carried in a tone may be added to a base or carrier signal by modulating the base signal.

Receiving an Information Carrying Tone Associated With a Promotion on a Mobile Device FIG. 5 is a flowchart of one example method 500 for communicating promotional information to a mobile device, which may be initiated by communicating one or more information carrying tones, in accordance with various embodiments of the invention. The method 500 may provide for associating tones with promotional information, transmitting information carrying tones to a mobile device, and subsequent communications with the mobile device based on the mobile device having received a given tone. Accordingly, an information source, such as a central information source, such as a back-end processor, or any third party information source, such as a merchant, manufacturer, service provider, and the like, can interact with consumers via their mobile device to transmit promotional information for encouraging consumer behavior.

The method 500 may begin at block 505. At block 505, an information source may associate promotional information with one or more tones (or tone data carried by the tones) to be transmitted to one or more mobile devices. The information source may be any information source, such as the information source 115 described in detail with reference to FIG. 1.

In one example, a central information source may receive promotional information from another entity, such as any third party entity associated with the promotion being offered. The central information source may then store this promotional information in memory, such as in one or more databases or other data storage devices, associated with tones and/or tone data. For example, as described in more detail herein with reference to FIG. 1, tone data transmitted by a tone, such as a location or other unique identifier, may be associated with the promotional information such that it may be used to identify the promotional information when received. The tone data may permit the central information source (or other entity) to search for promotional information stored in a memory. In one embodiment, tone data may include a location or other unique identifier that indicates another information source, such as a third party information source, whereby the location identifier can be utilized to request additional promotional information from another information source, such as is described in detail with reference to FIG. 7 for example.

Following block 505 is block 510, in which one or more information carrying tones are transmitted to a mobile device. Tones may be transmitted to a mobile device using any tone transmission device, such as one or more tone transmission devices 105 described with reference to FIG. 1. For example, a tone transmission device may include, but is not limited to, such as a television transmitting audiovisual content, a radio transmitter transmitting radio content, or a standalone tone transmission device. The mobile device may be any mobile device, such as the mobile device 110 as described with reference to FIG. 1.

In example embodiments, a mobile device may perform additional processing of a received tone, such as to extract tone data from the tone. In one example, the mobile device may perform processing to extract a location or other unique identifier that is associated with promotional information, as described with reference to block 505. In other embodiments, the mobile device may perform additional processing, including, but not limited to, storing the received tone and/or the extracted tone data in memory, retrieving additional information from a memory of the mobile device, requesting input from an operator, and/or receiving the operator's input, prior to any subsequent transmissions with an information source in response to receiving a tone.

Following block 510 is block 515, in which an information source receives an indication responsive to the mobile device receiving the tone transmitted at block 510. The indication may be received simply to inform the information source that the mobile device received the tone, and may optionally include tone data extracted from the tone, such as a location or other unique identifier. In other embodiments, however, the initial receipt of the indication from the mobile device may serve both to indicate that the mobile device received the tone and to request additional promotional information, such as details regarding the promotion and/or an actual redeemable promotion.

In example embodiments, the indication received at block 515 can include one or more of a location or other unique identifier extracted from the tone, an identifier of the mobile device, and/or an identifier of the operator of the mobile device. The identifier of the mobile device and/or operator may be used by the information source to associate subsequent information transmitted to/from the mobile device, as well as to identify the operator to a third party information source, such as a retailer running the promotion. According to one embodiment, one or more of the identifier of the operator or the mobile device may be stored in a user profile associated with the mobile device, such as the user profile 138 as described with reference to FIG. 1.

In other embodiments, however, multiple messages may be received from the mobile device at block 515. For example, one or more separate messages may be transmitted from the mobile device identifying the tone data, the mobile device, the operator, and/or any other additional information. In another example, one or more separate message may be transmitted form the mobile device requesting additional information and/or promotion validation, activation, or other processing.

Moreover, according to one embodiment, the information source operable to receive the indication at block 515 can be the same information source, or one associated therewith, that associates the promotional information to the tone, such as the central information source described at block 505. For example, the central information source may be responsible for generating the promotional information, storing the promotional information, associating promotional information to one or more tones, and subsequently processing promotional information upon transmitting a tone to a mobile device, such as for validation and/or activation. Though, in other embodiments, the information source operable to receive the indication at block 515 may be a different information source from the information source that associates the promotional information to the tone at block 505. For example, a third party information source, such as a different back-end processor, may participate in validating and/or activating a promotion for an operator, instead of or in addition to the central information source. In yet other embodiments, a central information source and one or more third party information sources may participate together, exchanging information therebetween, to retrieve and/or transmit additional promotional information, as described in detail with reference to FIG. 7.

Following block 515 is block 520, in which the information source may optionally retrieve additional promotional information responsive at least in part to receiving the indication as at block 515, according to one example embodiment. Additional promotional information, may include, but is not limited to, promotion details, terms, conditions, promotion rules, product or service descriptions, and the like. In one embodiment, additional promotional information may be retrieved and transmitted to the mobile device (or to the operator via any other means) automatically in response to receiving the indication at block 515. Though in other embodiments, additional information may be retrieved and transmitted only when requested by the mobile device or operator.

According to one embodiment, additional promotional information can be stored by the central information source. In another embodiment, instead of or in addition to retrieving information from the central information source, the central information source may request additional information from one or more third party information sources.

The tone data, or other promotional information associated with the received tone, may be used to retrieve additional promotional information from memory or from a third party information source. For example, according to one embodiment, the tone data may include a location identifier identifying the respective promotion and promotional information stored in memory. In another embodiment, a unique identifier identifying one or more third party information sources associated with the promotion may be received at block 515 and used to retrieve additional promotional information from one or more third parties.

In some embodiments, the information source may perform processing on the additional information retrieved prior to transmitting to the mobile device or operator. Additional processing steps may include, but are not limited to, formatting, generating text or audio messages from data elements and predefined messages, generating user interface for display, sorting, filtering, and the like.

Additional promotional information may be transmitted to the mobile device by a variety of techniques. For example, the additional promotional information may be transmitted in text or graphic form for output to a display, or in audio form for playing over a speaker. In other embodiments, the additional promotional information may be transmitted to the mobile device as a website address to a website or other Internet-based application accessible over a cellular network (or other network, such as Wi-Fi network), permitting additional promotional information to be displayed on the mobile device upon accessing a website providing the information. Moreover, while a single message is being described herein, additional promotional information transmitted between information source and the mobile device (in this or any other communication described) may be transmitted in multiple messages.

In one embodiment, the additional promotional information may be transmitted by a central information source, such as the information source receiving the indication at block 515. Though in other embodiments, the additional promotional information may be transmitted by another information source, such as one ore more third party information sources associated with the promotion. For example, a central information source may receive an indication and transmit a request for additional promotional information from a third party information source, and in response to the request, the third party information source may be operable to transmit the additional promotional information directly to the mobile device, without transmitting via the central information source. In one example, a request for additional promotional information transmitted from the central information source to the third party information source may include an identifier of the mobile device, such as, but not limited to, a telephone number, a UICC identifier, a SIM card identifier, a IMSI number, and the like, that will enable the third party information source to communicate with the mobile device directly. In another example, an identifier of the operator and/or means to communicate with the operator, such as, but not limited to, a telephone number, name, username, email address, account number, or any other unique identifier, may be transmitted to the third party information source to enable the third party information source to communicate with the operator directly.

Moreover, in one example embodiment, the information source may also optionally receive additional information from the mobile device. For example, the mobile device operator may provide additional information to the information source, for storing in memory and/or transmitting to a third party information source. According to one embodiment, the additional information may be an operator response to promotional information or a request previously presented to the operator. For example, the operator may be requested to input operator-specific information, which may include information such as, but not limited to, name, date of birth, social security number, street address, city, state, zip code, telephone number(s), email address, age information, preferences, password information, account information, billing information, product information, and the like. Information received from the mobile device may be stored in memory at the central information source and/or transmitted to a third party information source.

In embodiments receiving additional information from the mobile device, the request for information to the mobile device and/or the additional information received in response thereto may occur at any point in the method 500, such as prior to or at the same time as transmitting the indication at block 515, in response to the optional transmission of additional information at block 520, and the like. In yet another embodiment, the mobile device may be configured with programming instructions and associated data to request various input from the operator at any point in the method 500 without communicating with one or more information sources. For example, a tone processing application, such as the tone processing application 137 described with reference to FIG. 137, may request input from the operator upon receiving the tone as transmitted at block 510, upon receiving any additional promotional information at block 520, and/or at any other time. The request for information may be triggered based at least in part on the information in the tone, such as the tone data identifying a location or other unique identifier, and/or any additional promotional information transmitted.

Following block 520 is block 525, in which the validity of the promotion associated with the tone transmitted at block 510 can optionally be verified. In various embodiments, the promotion may have conditions or constraints associated therewith, such that it may not be valid for all consumers, may only be valid after predefined duration of time, may only be valid in certain geographies, may only be valid for a predefined number of redemptions, and the like. Accordingly, upon receiving an indication that a mobile device operator received a tone carrying promotional information, an information source may perform processing to determine the validity of the respective promotion. Again, the information source performing the validity processing may be the central information source, one or more third party information sources, or any combination thereof.

Processing that may optionally be performed at block 525 can include, but is not limited to, retrieving promotional information associated with the tone data, which may be stored locally or at a third party information source, reviewing promotion conditions (e.g., expiration and/or active dates, active geographies, restricted geographies, active facilities, restricted facilities, active merchants, restricted merchants, active consumer lists, restricted consumer lists, active account types, restricted account types, etc.), and determining whether the present conditions satisfy the respective promotion conditions.

As a result of determining that the promotion is valid and/or is valid for the respective operator, the promotion may optionally be activated for that operator. Activation may be accomplished in a variety of ways, if at all, such as, but not limited to, generating an access or authorization code or password, creating or updating a record associated with the operator indicating the active promotion, creating or updating a record associated with the promotion indicating that the operator is activated, notifying a merchant, manufacturer, or service provider, and the like.

Following block 525 is block 530, in which the information source may generate and store an entry in memory associating the operator of the mobile device with the promotional information. Storing an association of the operator with the promotion may act as part of an activation process, for example, in embodiments where promotions may only be available upon validation or approval for specific individuals. In other embodiments, associating an operator with the promotion may facilitate subsequent communications, reporting, status tracking, and the like. Any operator identifying information may be stored in memory, such as, but not limited to, telephone number, name, username, email address, account number, or any other unique identifier.

Similarly, in one embodiment, a promotion may be associated with an operator's account. For example, an account with a third party associated with the promotion, such as a rewards or loyalty account, or a financial account, such as a debit or credit account. Associating the promotion with an account may also serve to activate the promotion for that operator. In addition, associating the promotion with the operator's account may also serve as a mechanism for redeeming the promotion, such as, but not limited to, retrieving promotion information by account during redemption or automatically redeeming the promotion when the account information is provided or otherwise accessed during a transaction.

In one embodiment, an operator identifier may be transmitted to one or more third party information sources, enabling a third party information source to identify the operator and/or associate the operator with the respective promotion. For example, in various embodiments, a third party information source may communicate directly with the mobile device or operator. One or more operator identifiers can facilitate contacting the operator, such as by identifying the operator and/or providing operator contact information. In addition, in one embodiment, to redeem a promotion, the entity associated with the promotion may desire to validate that the operator is in fact approved for or otherwise associated with the promotion.

Following block 530 is block 535, in which the information source may optionally transmit a response to the mobile device or operator. In various embodiments, a response may be an activation confirmation, an actual redeemable promotion, or any combination thereof. For example, an activation confirmation can serves to notify the operator of the mobile device that the promotion is in fact valid and/or activated and ready for redemption. An activation confirmation may be embodied as a text-based message, a graphic message, and/or may contain an access code, authorization code, password, promotion details, and the like. In addition to, or instead of, an activation confirmation, a response to the mobile device or operator may include a redeemable promotion, such as, but not limited to, a coupon, an access code, an authorization code, a barcode, a password, an image, a graphic display or depiction of a coupon, an electronic file, a printable image or depiction of coupon, or any other means for indicating the terms and/or validity of the promotion. Moreover, in one example embodiment, additional promotional information may be transmitted with the response, such as promotion rules, conditions, expiration date, participating locations, and the like.

In addition, if the validation and/or activation processing that may optionally occur at block 525 indicates that the promotion is not valid or could not be activated for the operator, which may occur for various reasons, the response transmitted at block 535 may indicate a rejection. In one embodiment, the rejection response may indicate the reasons for rejection and/or request additional information or that the operator resubmit information, such as the tone, operator identifying information, and the like.

However, if the response transmitted at block 535 is positive, the operator may proceed to redeem the promotion according to the promotion terms, such as is described in detail with reference to FIG. 9.

The method 500 may end after block 535, having communicated promotional information with a mobile device based on an initial tone transmitted to the mobile device.

FIG. 6 is a flowchart of one example method 600 for receiving and responding to information carrying tones associated with promotional information that includes receiving confirmation that a given event, activity, or other information was perceived before activating the promotion, according to one embodiment. For example, according to one embodiment, a promotion may be tied to an event, such as a television or radio broadcast, or an activity, such as a store opening, product demonstration, survey completion, and the like, which may only be activated upon confirming that such an event or activity occurred and/or that the operator participated. To confirm whether the predefined event or activity occurred or that the operator participated, confirmation data may be generated and associated with the promotional information and subsequently broadcast, displayed, or otherwise transmitted during the occurrence of the predefined event or activity. Thus, only individuals that were actually present for the event or activity can learn the confirmation data and provide it to an information source for validation and/or activation of the promotion for that operator based at least in part on the confirmation data.

Separating the transmission of confirmation data from the tone and associated tone data provides additional flexibility in establishing an initial contact with individuals using an information carrying tone, while still confirming that the individual viewed or participated in the predefined event or activity. For example, information carrying tones can be transmitted to mobile devices via multiple channels (e.g., television broadcast, radio broadcast, and/or standalone tone transmission device) over a longer period of time to increase potential participants in the promotion. Having received a tone associated with a respective promotion can also enable additional promotional information, advertisements, and/or reminders about the promotion and the associated event to be transmitted to the mobile device or operator.

The method 600 may begin at block 605, in which an information source may associate promotional information with one or more tones (or tone data carried by the tones) to be transmitted to one or more mobile devices, in a manner similar to that described with reference to FIG. 5.

Following block 605 is block 610, in which confirmation data can be generated and associated with the promotional information. In various embodiments, confirmation data may include, but is not limited to, a code or other alphanumeric sequence, a word or series of words, an image, time of day, television channel, radio channel, or any other data which may defined and associated with the promotional information.

In one example embodiment, confirmation data may be generated and stored by the central information source. For example, codes, words, images, and the like, may be generated, stored locally, and then transmitted to the entity responsible for broadcasting or hosting the associated event for broadcast or display during the event. As an example, the central information source may generate a unique code associated with the event, and distribute the unique code to television broadcaster for display during a television broadcast with which the promotion is associated (e.g., programming that, if watched, the viewer can receive a discount at a given merchant, etc.). The central information source may store one or more unique identifiers of the confirmation data, such that it can be determined whether the confirmation data received from an individual is correct.

In other embodiments, content broadcasters, third party information sources, merchants, manufacturers, service providers, marketers, and the like, may generate and distribute confirmation data, notifying the central information source (or third party information source) of the confirmation data for validation when received from individual mobile devices or operators, such as is described in more detail below.

Following block 610 is block 615, in which an information tone carrying associated with the promotional information is transmitted to the mobile device, in a manner similar to that described with reference to FIG. 5.

Following block 615 is block 620, in which the confirmation data may be communicated to the operator of the mobile device. As described, confirmation data may be embodied in various forms and may be communicated or otherwise presented to an operator by various means.

For example, as described above, according to one embodiment, the information carrying tone may be transmitted at any time before the associated event. As an example, the tone may be transmitted during one or more commercials or from one or more advertisement displays that indicate that individuals may participate in the associated promotion if they watch given programming (e.g., television series premier, pay-per-view event, etc.). Subsequently, during broadcast of the programming, confirmation data may be broadcast at one or more periods during the programming (e.g., message, code, image, displayed across the screen, audio message played, etc.). The mobile device operator, having previously received the tone, may then be permitted to provide the confirmation data, as described below, which can be used to validate or otherwise activate the promotion for that operator.

In another embodiment, the tone may be transmitted during the event, such that only a mobile device operator perceiving or participating in the event will receive a tone on a mobile device. For example, in one embodiment, the tone may be transmitted at or near the same time the confirmation data is communicated, such that an operator's mobile device receives the tone and shortly thereafter is permitted to input the confirmation data. As an example, a television broadcast may simultaneously broadcast an information carrying tone associated with the promotional information and a confirmation data message. Accordingly, an operator may cause the mobile device to receive the information carrying tone and subsequently input the confirmation data that is also displayed. As an other example, an operator may be attending a promotional event at a location, such as a store opening, that has standalone transmission devices transmitting information carrying tones as well as flyers, posters, or any other displays indicating the confirmation data. In this example, an operator may receive the tone with the mobile device and also provide the confirmation data input to the mobile device while at the promotional event. Various other events and techniques for transmitting, displaying, or otherwise communicating confirmation data can be employed.

Following block 620 is block 625, in which an information source receives an indication responsive to the mobile device receiving the tone transmitted at block 615, in a manner similar to that described with reference to FIG. 5.

Following block 625 is block 630, in which the information source may request the confirmation data from the operator upon receiving the indication, such as by transmitting a display or other message to the mobile device requesting the operator to input confirmation data. In one example embodiment, the information source can coordinate transmission of the request for confirmation data with the event that communicates the confirmation data at block 620. Though, in other embodiments, the request for confirmation data can be transmitted at any time after receiving the indication at block 625. For example, in one embodiment, upon receiving the indication at block 625, the information source may transmit a message that includes a request for confirmation data that can be stored by the mobile device and accessed by the operator upon perceiving the confirmation data.

In another embodiment, however, the confirmation data may be input to the mobile device prior to transmitting the initial indication at block 625. For example, the mobile device may have computer program instructions configured to request confirmation data upon receiving a tone. In another example, the tone data may include information that when extracted instructs the mobile device to request confirmation data input. Thus, according to this embodiment, the confirmation data may be received from the mobile device at or near the same time as the indication at block 625, such that a request at block 630 is not required.

Following block 630 is decision block 635, in which the information source may determine whether confirmation data was received from the operator. The confirmation data may be received from the mobile device, or via any other communication means, such as email, a webpage, and the like. If it is determined at decision block 635 that no confirmation data is received, the information source may optionally continue to wait, may optionally re-transmit the request for confirmation data at block 630, or may end the processing.

If it is determined at decision block 635 that confirmation data was received, decision block 640 follows, in which the information source may process the received confirmation data to determine if it is correct for the associated promotional information. The information source may compare the confirmation data to that stored locally and associated with the promotional information at block 610 to determine a match. If it is determined that the confirmation data is not correct, the information source may re-transmit the request for confirmation data at block 630. In one embodiment, the information source may also transmit an error message to the mobile device or operator stating that the confirmation data was incorrect. In yet another embodiment, the information source may end the processing and the method 600 ends.

According to one embodiment, confirmation data processing can be performed by the central information source. In another embodiment, however, the central information source may transmit the received confirmation data to a third party information source to perform confirmation data processing and determine whether it is correct. In yet another embodiment, the confirmation data may be transmitted from the mobile device directly to a third party information source for processing and subsequent promotion activation and messaging. In yet another embodiment, such as one in which the mobile device includes programming instructions operable to store and process confirmation data, such as the tone processing application 137 described with reference to FIG. 1, the mobile device and associated programming instructions may be operable to process the confirmation data locally to determine whether the data provided by the operator is correct. Thus, in response to a request for confirmation data at block 630, the mobile device may transmit the confirmation data, or transmit an indication that the confirmation data is correct or rejected, such that decision block 640 may base its determination at least in part on the indication received by the mobile device.

If it is determined at decision block 640 that the confirmation data is correct for the associated promotional information, then blocks 645-655 follow, in which promotion processing can continue, such as to activate and notify the operator, in manners similar to that described with reference to FIG. 5. At block 645, the promotion can be activated for the operator of the mobile device. At block 650, the operator and/or the mobile device may be associated with promotional information. At block 655, an actual redeemable promotion and/or activation confirmation message may be transmitted to the mobile device or operator.

The method 600 may end after block 655, having communicated promotional information with a mobile device based on an initial tone transmitted to the mobile device and having determined whether the operator perceived a predefined event and provided correct confirmation data before activating the promotion for the operator.

FIG. 7 is a flowchart of one example method 700 in which a central information source and one or more third party information sources together facilitate communicating and processing promotional information and activating promotions for mobile device operators, according to one embodiment. The method 700 may provide integration between a central information source and one or more third party information sources, distributing the roles and responsibilities therebetween. By distributing some functions to be performed to one or more third party information sources, the amount of data and transaction processing managed by a central information source can be directly greatly reduced. In addition, by including the third party information sources, such as those sponsoring or otherwise associated with the promotions, additional rules and business logic may be implemented by each third party information source that is particular to that entity and/or more specific to the promotion. It may be beneficial to limit the amount of information provided to and/or processed by a central information source, such as to maintain company trade secrets, business advantages, marketing information, and the like. Accordingly, the method 700 provides one example embodiment of limiting that amount of information and/or transaction processing performed by a central information source by integrating with one or more third party information sources.

The method 700 may begin at block 705. At block 705, a central information source receives an indication responsive to a mobile device receiving a tone which has been previously associated with promotional information, as is described above with reference to FIG. 5.

Following block 705 is block 710, in which the central information source may identify particular promotional information with which the received tone is associated. In one example embodiment, the central information source may store in a memory tone data or other identifiers associated with promotional information, such as in a look-up table, relational database, or other data storage means. In another embodiment, the central information source may just associate tone data, such as a location or other unique identifier with one or more third party information sources, such that the central information source need only to transmit a location or other unique identifier to the proper third party information source, which can reply with associated promotional information and/or continue promotion processing directly with the mobile device or operator.

Following block 710 is block 715, in which the central information source may associate the operator of the mobile device (or associate the mobile device) with the promotional information identified in block 710. For example, the central information source at block 705 may store in memory mobile device identifiers (e.g., telephone number, a UICC identifier, a SIM card identifier, a IMSI number, etc.) and/or operator identifiers (e.g., a telephone number, name, username, email address, account number, etc.) in one or more records associated with the promotion. In another embodiment, the mobile device identifier alone may be used to identify the operator, and no further association with the operator may be performed. The mobile device identifier and/or operator identifier may be provided automatically as part of the message received from the mobile device, such as at block 715, may be provided in a separate message, or may be previously stored in memory, such as if the operator is already registered with the central information source (or other entity). According to one example, the mobile device may include programming instructions and a user profile, such as the tone processing application 137 and the user profile 138 described with reference to FIG. 1, which together are operable to retrieve mobile device identifiers and/or operator identifiers stored in the user profile and include in one or more messages transmitted to the central information source (or other information source). In other examples, one or more messages transmitted to an information source may automatically include an identifier, such as a telephone number.

By associating the operator (or the mobile device) with the promotional information, the central information source and any subsequent third party information sources, will have a record of which operator received a tone or other promotional information. Such a record may be used to immediately to facilitate promotion processing, validation, and/or activation, or may be used subsequently, such as during follow-up marketing and/or reporting.

Following block 715 is block 720, in which the central information source may determine one or more third party information sources associated with the promotional information identified at block 710. As described above, the central information source may store in a memory an association between the respective tone and a third party associated with the respective promotional information.

Following block 720 is block 725, in which the central information source may transmit a message to the third party information source identified at block 720. In various embodiments, the message may include the tone data received with the indication at block 705, any promotional information that may be stored by the central information source and retrieved at block 710, operator and/or mobile device identifiers determined at block 715, confirmation data, and the like. The central information source and any third party information sources may communicate over a network, such as the network 140 described in detail with reference to FIG. 1.

In one embodiment, the central information source may just transmit the tone data and/or other promotion identifying information with an operator identifier, leaving any additional communications and transaction processing to the third party information source. For example, the third party information source can then communicate directly with the mobile device (or with the operator by any other means) to provide promotional information, to validate and/or activate the promotion, and/or to transmit an actual activation confirmation message and/or a redeemable promotion. Accordingly, no further processing and/or communications would be required by the central information source. Though, in one embodiment, the third party information source may communicate a status update to the central information source for reporting, record keeping, and the like.

In another embodiment, the central information source may act more as an intermediary between the mobile device and the third party information source. For example, upon receiving the indication that the mobile device has received the tone, the central information source may transmit the tone data and/or other promotion identifying information with an operator identifier, and receive subsequent instructions and/or messages from the third party information source for relaying to the mobile device or operator.

In yet another embodiment, the central information source may perform much of the transaction processing, including providing additional promotional information to the mobile device and/or operator, verifying confirmation data, validating the promotion for the operator, activating the promotion for the operator, transmitting an actual redeemable promotion to the operator, and/or transmitting an activation confirmation message to the operator, and transmit status updates and/or confirmations to the third party information source. Thus, in one embodiment, the messages transmitted at block 725 may be updates or only require minimal processing by the third party information source.

Following block 725 is block 730, in which the central information source may optionally receive communications from the third party information source in response to the communications sent in block 725. According to one embodiment, the third party information source may transmit message information to be sent by the central information source to the mobile device, such as additional promotional information, an actual redeemable promotion, activation confirmation, and the like. According to another embodiment, the third party information source may transmit status updates to the central information source in response to communicating directly with the mobile device.

In one embodiment, the central information source may store information contained in the communications received at block 730 in a memory. For example, the information received may be stored for subsequent retrieval and transmission to the mobile device. In another example, the information received may be stored for reporting, transaction tracking, and/or subsequent marketing communications.

Following block 730 is block 735, in which the central information source may optionally transmit additional information to the operator. As described above, the information may be transmitted to the operator via the mobile device or by any other means, such as over the Internet via a website, a telephone message, an email, and the like. In one embodiment, the additional information may be received from the third party information source at block 730 and transmitted to the mobile device by the central information source. As described above with reference to block 725, in one embodiment, the third party information source may perform all or most of the additional communications with the mobile device and/or the operator such that block 735 may not be performed by the central information source.

In various embodiments, blocks 725-735 may be repeated to permit multiple messages be transmitted between the central information source and the third party information source and/or with the mobile device.

The method 700 may end after block 735, having divided some of the transaction processing tasks between the central information source and one or more third party information sources.

Processing By a Mobile Device

FIG. 8 is a flowchart of one example method 800 for receiving information carrying tones associated with promotional information at a mobile device and subsequent processing of the tone data and associated promotional information by the mobile device. The method 800 further illustrates example processing capable of being performed by a mobile device, such as providing promotional information to a mobile device operator and requesting and processing operator input. As described herein, receiving initial tone data at an operator's mobile device creates a variety of opportunity to efficiently and effectively interact with the operator, such as to receive information from the operator, to monitor and confirm whether the operator may have satisfied promotion conditions, and to provide the operator with redeemable promotions embodied in various forms.

The method 800 may begin at block 805, in which a mobile device may receive a tone that includes tone data that is associated with promotional information. The mobile device may be any mobile device, such as the mobile device 110 described in detail with reference to FIG. 1. Similarly, the tone may be transmitted to the mobile device in a manner similar to that described with reference to FIGS. 1-4, such as, but not limited to, via a television broadcast, radio broadcast, or a standalone tone transmission device.

For example, as described above, an operator may cause the mobile device to receive a tone when one is being communicated, such as may be indicated in a radio or television broadcast or as may be stated in an advertisement display associated with a standalone tone transmission device. According to one embodiment, the mobile device may include programming instructions, such as the tone processing application 137 described with reference to FIG. 1, operable to receive a command to receive a tone being communicated. For example, the tone processing application may activate a microphone or other audio input device to capture the tone and store the tone and/or extracted tone data in memory.

Following block 805 is block 810, in which the mobile device may process the tone to extract the tone data. As described above with reference to FIG. 1, the tone data may embodied in many forms and the tone may require additional processing to extract and further operate on the tone data. According to one embodiment, the tone data may include a location identifier that is generated and/or associated with promotional information stored and/or maintained by an information source, such as a central information source and/or third party information source as described herein. Thus, as part of the processing performed at block 810, programming instructions, such as the tone processing application, and associated mobile device hardware, such as one or more band pass filters and one or more analog-to-digital converters, can process the tone to identify and extract digital tone data, including one or more location identifiers. Additional processing, as further described herein, may be performed on the tone received by the mobile device, at this or any other point of the method 800.

According to one embodiment, tone processing may include associating mobile device or operator specific information with the extracted tone data, such as may be subsequently transmitted to one or more information sources to aid in managing the associated promotion. For example, in one embodiment, the tone processing application may be configured to request input from the operator, such as operator-specific information, which may include information such as, but not limited to, name, date of birth, social security number, street address, city, state, zip code, telephone number(s), email address, age information, preferences, password information, account information, billing information, and the like. Additional input describing the promotion or context, such as a product name, product description, merchant name, merchant description, and the like, may also be requested. The input provided by the operator may then be associated with the tone in a memory of the mobile device, permitting the mobile device to subsequently transmit the information to an information source.

According to another embodiment, the tone processing application may be configured to extract pre-established information that may be used to identify the operator, such as may be stored in a user profile, such as the user profile 138 described with reference to FIG. 1. For example, the user profile may include name, account number, email address, username, area code, zip code, phone number, mobile device number information that may be requested by and/or transmitted to an information source. In yet another embodiment, the tone processing application may be configured to extract information resident with the mobile device, such as a mobile device number, UICC identifier, SIM card identifier, or IMSI number, which may also be transmitted to an information source to identify the operator.

According to yet another embodiment, the tone processing application and/or the mobile device may not be configured to request input from the operator until the mobile device receives a request from another entity, such as an information source. For example, a request for information may be transmitted after an information source is notified that the mobile device received a tone and respective tone data, as further described below.

Following block 810 is block 815, in which the tone data extracted from the tone and/or additional information input by the operator may be stored in a memory of the mobile device. In example embodiments, the tone data may be stored in the memory only temporarily, such as when it may be transmitted to retrieve additional information from another information source, or may be further operated on by the processor of the mobile device, such as to retrieve additional information stored in or otherwise accessible by the mobile device, to display information associated with the tone data, and/or to request information from the operator of the mobile device. Though, in other embodiments, the tone data may be permanently stored in the memory, or stored in the memory for a defined period of time. In yet other embodiments, the tone data may be immediately transmitted to another entity, such as an information source, and storage in memory for any prolonged period of time may be unnecessary.

Following block 815 is block 820, in which the mobile device may transmit to an information source an indication responsive to the mobile device receiving the tone. The information source to which the indication can be transmitted may include, but is not limited to, a central information source, such as a back-end processor, or another entity, such as a third party information source associated with a merchant, manufacturer, or service provider associated with the promotion. This transmission may be performed to inform the information source that the mobile device received the tone, and may optionally include tone data extracted from the tone, such as a location identifier that may be extracted at block 810.

In other embodiments, however, the initial transmission from the mobile device to the information source may serve both to indicate that the mobile device received the tone and that the operator of the mobile device wishes to receive additional promotional information or otherwise participate in the associated promotion. As an example, according to one embodiment, when viewing a television broadcast, promotion information may be displayed on the screen and/or described in the audio portion of the content. As part of the promotion information, the instructions may indicate that if a viewer wishes to participate in the promotion, the viewer may activate their mobile device to receive a tone. In one example, the receipt of the tone can initiate the promotion validation and activation process for the operator. Thus, the information source managing the promotion needs only to be notified that the mobile device operator received the tone and which tone was received. Transmitting an indication that the mobile device received a tone and the location identifier (or other unique identifier) at block 820 can provide sufficient information to the information source to activate a promotion for the mobile device operator under these conditions.

Though, in other embodiments, additional information may be needed before an operator can decide whether to participate in a promotion. For example, a television broadcast may indicate to viewers that additional promotional information, including promotion rules, terms and conditions, activation information, and/or redemption information, may be retrieved by activating a mobile device to receive the tone. Upon receiving the tone, and extracting the location identifier or other tone data, the mobile device may transmit an indication to the information source that the user received the tone and the location identifier (or other unique identifier) extracted from the tone, which may serve to request additional information associated with the unique identifier (e.g., additional promotion information) from the information source. According to another embodiment, however, a request for additional information may be transmitted separately from the indication that the mobile device received the tone.

Moreover, according to one embodiment, the indication transmitted at block 820 may also include an identifier of the mobile device and/or the operator of the mobile device, such as is described above with reference to block 815. The identifier of the operator and/or the mobile device may be used by the information source to associate subsequent promotion information transmitted to/from the mobile device, as well as to identify the operator to a third party information source, such as a merchant, manufacturer, or service provider.

Following block 820 is block 825, in which additional promotional information may optionally be received and/or displayed on the mobile device. In embodiments in which additional information may be requested (or automatically transmitted) after initially receiving the information carrying tone, such as is described in embodiments occurring at block 820, the mobile device may receive additional information from an information source.

According to various embodiments, the additional promotional information may be received by the mobile device via cellular communication, such as an SMS message, email, audio message, or a website address, for example. Upon receiving the additional promotional information, the mobile device and its tone processing application may optionally perform additional processing on the information prior to display to the operator.

In other embodiments, however, the mobile device may already have additional promotional information stored in memory, such as information which may have bee previously stored in memory of the mobile device when downloading a software application or associated application supplements specific to the promotion associated with the tone or with the entity associated with the promotion. Information already stored in memory may be displayed separately or as a supplement to additional information received from an information source.

According to one embodiment, the mobile device may format and output the additional promotional information to the operator. For example, after any processing that may be required is performed, the additional information may be output in text form to a display screen or as an audio message may played over a speaker.

According to another embodiment, however, the additional information may be presented by a website or other Internet-based application accessible over a cellular network (or other network, such as Wi-Fi network), such that when displaying additional information, the mobile device accesses a website providing the information. The website address or other identifier may be provided to the mobile device in response to transmitting the indication and/or request for information to an information source at block 820. According to other embodiments, however, the tone data transmitted with the tone and extracted by the mobile device at blocks 805 and 810 may also include website address information, eliminating the need to transmit a request for additional promotional information from an information source. Providing the information via a website also allows dynamically delivering additional content, based on the operator's access or selection within the website (e.g., hyperlinks), expanding the volume of information that may be displayed to the operator. However, some mobile devices may not be operable to access Internet-based applications; thus, text and/or audio data transmitted to the mobile device, as described above, permit additional promotional information be presented to the user.

Additional promotional information transmitted and/or displayed to the user may include, but is not limited to, promotional information describing promotion details, terms, conditions, promotion rules, product or service descriptions, requests for input from the operator, such as is described with reference to block 810, or any other information that may facilitate describing and/or activating a promotion. Moreover, while only a single message is described, additional promotional information may be transmitted to and received by the mobile device as multiple messages.

Following block 825 is block 830, in which the mobile device may optionally request confirmation information from the operator, indicating that the operator perceived or otherwise received a confirmation message associated with the tone presented to the operator. Similar to that described in detail with reference to FIG. 6, some promotions may require that the operator perceive or otherwise participate in a predefined event or activity to be eligible for the promotion. To confirm whether the predefined event or activity occurred, confirmation data may be generated and associated with the promotional information and subsequently broadcast, displayed, or otherwise transmitted during the occurrence of the predefined event or activity.

According to one example embodiment requesting confirmation data, a mobile device may be configured to generate and display a request for the confirmation data to the operator, such as by programming instructions in the tone processing application. The tone processing application may be configured to generate a message (or retrieve a pre-stored message from memory) based at least in part on the tone data extracted at block 810, or based at least in part on additional promotional information received at block 825.

According to another embodiment, one aspect of the additional information received at block 825 may be a request for confirmation data, such as when the information source determines that confirmation data is required upon receiving the indication and the associated location identifier at block 820. Thus, the additional information received at block 825 may include a request message or other data to generate a request message for additional information, or may include a website address for a website operable to transmit and display a request for confirmation data to the operator.

In response to the optional request for confirmation data, the mobile device operator may input the confirmation data as perceived. Depending upon the manner by which the confirmation data is requested, and the manner by which the confirmation message was presented to the operator, the operator can input confirmation data by various means. For example, in one embodiment, the operator may enter a code, alphanumeric sequence, word, or series of words that are presented to the operator as a confirmation message into an I/O device associated with the mobile device, such as a keypad, touchscreen, or microphone and associated programming operable for voice recognition. In another example, the operator may enter a description of an image or select the image from multiple choices, such as may be displayed as the confirmation message by the tone transmission device (e.g., an icon flashing as part of a television broadcast or an icon displayed on a poster or other advertisement display). Other confirmation data may also be requested, such as, but not limited to, time of day, television channel, radio channel, or any other data which may defined and associated with the promotional information.

According to another embodiment, however, the confirmation data may be input to the mobile device prior to transmitting the initial indication at block 820. For example, the tone processing application of the mobile device may be configured to request confirmation data upon receiving a tone, or the tone data may include information that when extracted instructs the mobile device to request confirmation data input.

Following block 830 is block 835, in which confirmation data, if requested and entered at block 830, is transmitted to an information source. Transmitting the confirmation data from the mobile device to an information source may facilitate validating and/or activating the promotion for the operator, such as to confirm that the operator perceived or otherwise participated in the predefined event or activity, as described in more detail with reference to FIG. 6. According to example embodiments, the confirmation data may be transmitted to the information source from the mobile device via cellular communications, or via any other communication means, such as email, a webpage, IVR, and the like.

It is appreciated, however, that in some example embodiments, confirmation data is not requested and thus is not transmitted, such that validation and/or activation processing by an information source can proceed after block 825.

Following block 835 is block 840, in which the mobile device or the operator may optionally receive an activation confirmation and/or a redeemable promotion if the promotion has been activated for the operator. Upon processing the confirmation data and/or performing any subsequent validation and/or activation of the promotion for the operator, as described in more detail with reference to FIGS. 4-6, the operator may be notified whether the promotion is valid, whether it has been activated for the operator, whether there are any additional steps that may be performed by the operator, and the like. In addition, after processing the confirmation data and/or performing subsequent validation, the operator may receive an actual redeemable promotion for redemption during one or more transactions according to the promotion conditions, such as is described in detail with reference to FIG. 9.

According to one embodiment, the operator may receive an activation confirmation at the mobile device. The activation confirmation may be embodied in various forms, such as, but not limited to, an SMS message, an email, an audio message, a website address, and the like. The activation confirmation message may include various information, such as, but not limited to, confirmation text indicating that the promotion is valid and/or has been activated, a confirmation number or code, activation number or code, access code, authorization code, and the like. In addition, according to one embodiment, additional promotional information may be transmitted with, or in lieu of, the activation confirmation, which may include promotion rules, conditions, expiration date, participating locations, product descriptions, service descriptions, and the like.

In other embodiments, however, the activation confirmation may be transmitted via another means that does not require receipt or access using a mobile device and/or display on a mobile device (though, some mobile devices may also be operable to receive communications via these means), such as email, voicemail, website, paper mail, and the like.

According to one embodiment, the operator may receive a redeemable promotion. For example, similar to the activation message above, a redeemable promotion may be embodied in various forms, such as, but not limited to, an SMS message, a website address, an email, and the like. In various embodiments, the redeemable promotion may be, but is not limited to, a document or an image representing a coupon, a message displaying an access code, an authorization code, a barcode, a password, an electronic file that can be stored in memory and/or associated with other transaction applications and/or hardware, an electronic file representing a tone, a printable image or depiction of coupon, or any other means for indicating the terms and/or validity of the promotion. The redeemable promotion may be received at the mobile device and stored in a memory, or may be received by the operator via another means that does not require receipt and/or display using a mobile device, such as an email, voicemail, website, paper mail, and the like.

In one example, the redeemable promotion received by the operator may be a document or an image representing a coupon. For example, an image may be transmitted to and received at the mobile device for subsequent presentation to be redeemed. Upon receiving the image, the operator may display the image using the display screen of the mobile device during redemption, or the operator may print the image via a printer connected to the mobile device prior to redemption.

Similarly, in one embodiment, the redeemable promotion may be transmitted as a barcode unique to the promotion, permitting the barcode to be displayed from the mobile device, or previously printed and presented, for redemption during a transaction. A clerk may scan the barcode displayed on the display of the mobile device or enter a barcode number associated with the barcode to redeem the promotion.

In another example, the redeemable promotion may be a message displaying an access code, authorization code, or password. The access code, authorization code, or password can be provided during a transaction for redemption. For example, during a transaction the operator can provide a clerk the access code, authorization code, or password, enter it into a point of sale device, or enter it into a computer during online transaction. In another embodiment, the a access code, authorization code, or password may be provided to an account associated with the promotion and/or associated with the operator, permitting redemption using the account during a subsequent transaction. For example, upon entering or otherwise associating the access code, authorization code, or password with the operator's account, during a subsequent transaction the promotion can be automatically applied or a terminal operator can be notified that the promotion applies when the account is accessed during the transaction.

In yet another embodiment, an access code, authorization code, or password can be entered into a standalone terminal or kiosk operable to print a coupon, activate the promotion, automatically apply the promotion to a subsequent or previous transaction, and the like.

In another example, the redeemable promotion may be an electronic file representing the promotion stored in a memory of the mobile device and accessible by other transaction processing applications and/or hardware of the mobile device. For example, an electronic file representing the promotion, and/or containing promotion terms, can be accessed by another transaction processing application, such as a contactless transaction device (e.g., radio frequency identification tag application and hardware, near field communications application and hardware, infrared based application, bluetooth based application, etc.), online transaction application (e.g., Internet application accessible by the mobile device's web browser), mobile transaction application (e.g., SMS message based transaction), and the like. While processing transactions using any of these or other transaction applications or hardware, the electronic file associated with the promotion can be retrieved from memory and included or otherwise applied as part of the transaction for redemption.

In another example, an electronic file representing a tone that includes tone data identifying the promotion may received at the mobile device. For example, during a transaction, the operator may instruct the mobile device to transmit the tone to a receiver at a point of sale terminal for redemption. In another embodiment, the tone received at block 805 may be the same tone transmitted for redemption, such as if the operator has already been activated by an information source to receive the promotion and the tone need only to identify the promotion.

Additional techniques for transmitting or otherwise providing an operator with a redeemable promotion and subsequently processing the redemption are described below with reference to FIG. 9.

The method 800 may end after block 840, having received promotion information at a mobile device based on an initial tone transmitted to the mobile device, and optionally including subsequent communications between the mobile device and one or more information sources to provide additional promotional information, to transmit an activation confirmation, and/or to transmit a redeemable promotion to the operator.

FIG. 9 is a flowchart of one example method 900 for receiving and redeeming a promotion, based at least in part on having received a tone associated with the promotion at a mobile device. The method 900 further illustrates example techniques for presenting and redeeming a promotion received at a mobile device, or by the operator via any other means, such as described in detail with reference to FIG. 8.

The method 900 may begin at block 905. At block 905, a promotion is validated and/or activated for an operator of a mobile device after receiving an indication that the mobile device received a tone associated with the promotion, as described in detail with reference to FIGS. 5-7.

Following block 905 is block 910, in which an actual redeemable promotion and/or an activation confirmation is transmitted to the operator. The redeemable promotion and/or the activation confirmation may be embodied in various forms, and may be transmitted to the mobile device over cellular communications or to the operator via any other means, as described in detail with reference to FIG. 8.

Though, according to another embodiment, blocks 905 and 910 may not be performed, such that the operator can receive an information carrying tone, extract location or other unique identifier associated with the promotion, and communicate directly with a device for redemption (e.g., a transaction terminal at block 920 and 950 below, or entering information online or via a mobile device application at block 965). Accordingly, instead of communicating with a central information source and/or a third party information source, such as is described with reference to FIGS. 5-8, the operator may initially transmit a tone or other message to a device for redemption. The tone or other message can include at least the location or other unique identifier associated with the promotion, but may also include an identifier associated with the operator, or in other embodiments, associated with the mobile device, with an account, and the like. Upon receipt of the tone or other message, the device performing the redemption can then perform the validation, activation, and/or additional processing to confirm the promotion and process the redemption for the operator.

Following block 910 is block 915, in which the operator may present a redeemable promotion for redemption during or in association with a transaction. For example, the promotion may be redeemed during an in-person or online purchase transaction, when registering for a service, when paying a bill, and the like. A promotion can be presented for redemption in various ways, depending upon the form of the activation confirmation and/or the redeemable promotion received by the operator, such as is described by example with reference to block 840 of FIG. 8 and in more detail below. Blocks 920, 950, 955, 960, 965 illustrate example techniques for presenting a redeemable promotion for redemption during a transaction. Though, as described herein, other means for presenting and redeeming a promotion may be employed, according to various embodiments of the invention.

According to one example embodiment, block 920 may optionally follow block 915, in which an operator may transmit a tone from the mobile device to a terminal during a transaction for redemption. For example, in one embodiment, the redeemable promotion may be in the form of a tone carrying tone data that is associated with the promotion, associated with the operator, and/or associated with an account associated with the operator. According to one example embodiment, the tone includes at least an identifier or other data associated with the promotion and an identifier of the operator, permitting the transaction terminal to associate the promotion with the operator and to communicate operator information with the promotional information to a back-end processor during redemption (and optionally to validate or re-validate the promotion for the operator).

In one example, an actual tone may be transmitted to the mobile device, such as from a tone transmission device as described in detail with reference to FIG. 1. In another example, the mobile device may receive an electronic file representing a tone or having tone data stored as part of the electronic file (e.g., audio file, etc.), such that the mobile device may be able to generate and transmit the tone after retrieving and processing the electronic file. Upon receiving and performing any required processing, such as is described with reference to FIG. 1, the tone embodying the redeemable promotion (or the electronic file), the mobile device may store the tone in memory for subsequent transmission to a transaction terminal, or other device, operable to receive the tone.

Accordingly, in this example, an operator conducting a transaction to which the promotion applicable may command the mobile device to transmit the tone to redeem the promotion. In one embodiment, the tone may be transmitted to a transaction terminal, such as a POS terminal operable with a receiver, such as a microphone or other transducer. In another embodiment, the tone may be transmitted to another mobile device in communication with or acting as a transaction terminal. In other embodiments, the tone may be transmitted from one mobile device to another mobile device, such as if the operator uses two mobile devices, for that mobile device's subsequent redemption. A tone processing application of the operator's mobile device, such as the tone processing application 137 described with reference to FIG. 1, can be configured for retrieving the tone from memory and transmitting the tone from the mobile device, such as via a speaker of the mobile device, upon receiving the operator's command to redeem the promotion. In example embodiments, the mobile device may store multiple redeemable promotions, displayable for selection of the proper promotion by the operator through a user interface.

Following block 920 is decision block 925, in which, upon receiving the transmitted tone, it is determined by the transaction terminal whether the tone transmitted from the mobile device to the transaction terminal includes promotion information. For example, in one embodiment, the tone generated and transmitted to the mobile device from an information source as a redeemable promotion may include tone data that identifies the activated promotion, such as a unique identifier. Accordingly, the transaction terminal receiving the tone may process the tone data to extract the tone data to identify whether a promotion applies and, if so, which promotion.

In another embodiment, the tone transmitted from the mobile device to the transaction terminal may be the original tone communicated to the mobile device from a tone transmission device (e.g., television broadcast, radio broadcast, standalone tone transmission device, etc.), such as is described in detail with reference to FIGS. 4-6. In this embodiment, the tone data extracted may include the same location or other unique identifier that is used to identify the promotion by the information source to validate and/or activate the promotion for the operator. Thus, the terminal can also identify which promotion may apply to the transaction based on the same location identifier associated with the promotion.

In one embodiment, validation and/or activation of the promotion may be required when transmitting the original tone communicated to the mobile device from a tone transmission device. Thus, the operator may be requested by the transaction terminal or a clerk to also present an activation confirmation, such as an access code, authorization code, password, and the like, to verify that the operator has in fact been activated and/or validated for the promotion.

However, in other embodiments, such as those which do not require activation or validation, re-transmitting the same tone originally communicated to the mobile device from a tone transmission device may be sufficient for redemption. For example, in this embodiment, a mobile device operator may receive an initial tone at the mobile device from a tone transmission device (e.g., television broadcast, radio broadcast, standalone tone transmission device, etc.) and immediately present it for redemption without requiring the additional processing by an information source as described with reference to FIGS. 4-6. As such, in this example embodiment, it may not be necessary to transmit an indication to an information source, or to receive additional information, an activation confirmation, or a redeemable promotion in order to redeem a promotion that does not require validation or activation associating the operator with the promotion.

According to various embodiments, the transaction terminal may be any terminal operable to receive and subsequently process the tone, such as, but not limited to, a POS terminal, register, computer terminal, and the like. In one example embodiment, the transaction terminal may also be in communication with one or more information sources over one or more networks, such as the same information source or sources that are operable to process, validate, and/or activate a tone described in detail with reference to FIGS. 4-6. Communicating with an information source permits the transaction terminal to transmit a location or other unique identifier extracted from the tone data to receive additional information regarding the promotion, such as promotion conditions, like promotion value, expiration and/or active dates, active geographies, restricted geographies, active facilities, restricted facilities, active merchants, restricted merchants, active consumer lists, restricted consumer lists, active account types, restricted account types, and the like.

Though, according to another embodiment, the terminal may have programming instructions stored in an associated memory that include information necessary to identify promotion information and associated conditions. For example, the terminal may receive periodic batch updates with promotion information, activated operators or accounts, and the like, limiting the real-time communications overhead required when processing a transaction.

If it is determined at decision block 925 that the tone includes promotion information, block 930 follows. At block 930 the promotion is redeemed for the respective transaction according to the promotion terms. As described herein, the promotion may be for a discount amount, a percentage discount, a free item, a free service, a trial period, or any other promotion offering as desired.

However, if it is determined at block 925 that the tone does not include promotion information, decision block 935 follows. At decision block 935, it is determined by the terminal whether the tone transmitted from the mobile device to the terminal includes account information, which may be used to identify the promotion that is to be applied for the respective transaction. For example, in one embodiment, the tone generated and transmitted to the mobile device by the information source as a redeemable promotion may include tone data indicating an account associated with the operator, such as a credit account, debit account, membership account, loyalty account, and the like. In one example, the central information source may generate a new account, which associates one or more of the operator's existing accounts, such as an existing loyalty or credit account, and associate the new account with the mobile device.

As part of processing the indication that the mobile device received a tone associated with a promotion and validating and/or activating the promotion for the device operator, an information source may update one or more accounts associated with the operator with information identifying the promotion as a redeemable promotion for the operator. As part of the tone processing to generate redeemable promotion, the information source may transmit a tone, or electronic file associated with a tone, that includes tone data indicating the operator's account that has been updated with promotion information. Associating a promotion with one or more accounts can be beneficial to permit redeeming multiple promotions provided to the operator within a single transaction, such that upon sending account information, the transaction terminal can communicate with one or more information sources to identify all of the relevant active promotions for the operator and process the redemptions accordingly.

In another embodiment, the mobile device may have a tone, or an electronic file associated with a tone, stored in memory that includes tone data indicating an account associated with the operator independent of any other promotion processing described herein. Thus, in this example, the tone including account information is not transmitted from an information source to the mobile device from another information source during promotion processing, but instead independently stored in memory and available irrespective of the other promotion processing. This may be useful if the mobile device can use tones to transmit account information to for processes other than the redemption processing described herein. Similarly, a user profile, such as the user profile 138 described with reference to FIG. 1, can also include account (and other operator information), which may be retrieved and added to the tone or other transmissions to the transaction terminal using the tone processing application (or manually entered or verbally communicated at the transaction terminal).

According to one example embodiment, the tone includes at least an identifier or other data associated with the promotion and an identifier of the operator, permitting the transaction terminal to associate the promotion with the operator and to communicate operator information with the promotional information to a back-end processor during redemption (and optionally to validate or re-validate the promotion for the operator).

If it is determined at block 935 that the tone includes account information, block 940 follows, in which the transaction terminal determines the promotion information based at least in part on the account information extracted from the tone data transmitted by the mobile device. For example, in one embodiment, the transaction terminal may request account information over a network from an entity responsible for maintaining and/or processing account information for the respective account. For example, the transaction terminal may send a transaction message to the operator's designated account (e.g., loyalty or credit account) via typical transaction processing. In another example, such as if the central information source created a new account associating other pre-existing accounts, the transaction terminal may send a transaction message to the central information source first, upon which one or more of the pre-existing accounts can be notified.

In response, the entity may reply with the promotion information stored and associated with the operator's account, permitting the transaction terminal to apply the promotion to the transaction. In another embodiment, the account information represents an account associated with the entity processing the transaction (e.g., a membership or loyalty account at a merchant), such that the transaction terminal can be operable to determine account information without transmitting a request to a third party.

Upon receiving or otherwise determining the promotion information at block 940, the promotion is redeemed for the respective transaction according to the promotion terms at block 930.

However, if it is determined at block 935 that the tone does not include account, block 945 follows. At block 945, failing to determine promotion or account information, the transaction terminal may request additional information from the mobile device or operator and/or request the mobile device to retransmit the tone to the transaction terminal. In another embodiment, one or more other redemption presentation techniques may be performed if tone processing fails, such as those described with reference to blocks 950, 955, 960, and 965.

According to another embodiment, instead of, or in addition to, transmitting a tone from the mobile device, block 950 may optionally follow block 915, in which a radio frequency signal may be transmitted to a transaction terminal from the mobile device. For example, according to one embodiment, the mobile device may be integrated or otherwise associated with a radiofrequency identification transmission device ("RFID device") operable to permit contactless transactions with transaction terminals in communication with a RFID receiver. Accordingly, in this embodiment, a mobile device receiving an actual redeemable promotion, such as an electronic file containing promotion redemption information, can retrieve the redeemable promotion information from memory and transmit the promotion information to a transaction terminal via RFID communications.

Moreover, according to one embodiment, a contactless transaction device and associated account and RFID (or other contactless means) payment application (e.g., GoTag), such as may be developed to permit RFID communications of account or other payment information, can retrieve information associated with the actual redeemable promotion stored in an electronic file. Thus, when transacting with the contactless transaction device using an RFID payment application and associated hardware, as described, can further apply or otherwise communicate the redeemable promotion or associated terms. In yet another embodiment, when transacting using an RFID payment application and associated hardware, the promotion processing performed by an information source, such as a back-end processor, as described with reference to FIGS. 5-7.

Following block 950 are block 925-945, operating in a manner similar to that described with regard to an embodiment transmitting a tone containing promotion and/or account information. For example, at block 925, the transaction terminal can determine whether the RFID signal received includes promotion information for redeeming the promotion in association with the respective transaction at block 930. If the RFID signal does not contain promotion information, at blocks 935 and 940, the transaction terminal can determine whether account information is included in the RFID signal. If neither promotion information nor account information are included in the RFID signal transmitted by the mobile device, the transaction terminal may request the operator retransmit the RFID signal or request additional information at block 940, such as presentation of a redeemable promotion via one or more of the other techniques.

According to another embodiment, instead of transmitting a tone or RFID signal to a transaction terminal, such as at blocks 920 or 950, the operator may transmit the tone or RFID signal from a first mobile device to a second mobile device. The tone or RFID signal (or multiple tones or RFID signals) can include enough information to identify the promotion (e.g., the location identifier) and to prove the validity, activation, etc. of the promotion for the operator that has already been performed (e.g., at blocks 905 and 910). For example, an operator identifier, an activation confirmation, or an actual redeemable promotion may be transmitted from or otherwise referenced by the first mobile device to the second mobile device. This embodiment may be beneficial if an operator uses two mobile devices, and received an information carrying tone on a first mobile device but desires to redeem the associated promotion with another.

According to yet another embodiment, block 955 may instead follow block 915, in which an actual redeemable promotion may be displayed by the mobile device for redemption. For example, in embodiments in which the redeemable promotion transmitted to the mobile device by the information source can be displayed on a display screen of the mobile device, such as an image of a coupon, an access code, an authorization code, a password, a barcode, and the like, the mobile device may simply be shown to a clerk operating the transaction terminal to process the redemption.

For example, in one embodiment, the redeemable promotion may be an image representing a coupon, which can be displayed by the mobile device. The image may include one or more of promotion terms, restrictions, limitations, value, expiration date, access or authorization code, operator information, account information, and the like. Displaying the coupon can be used in lieu of printing or otherwise obtaining a paper copy of a coupon or other document representing the promotion.

As another example, in another embodiment, the redeemable promotion transmitted from the information source may include an access code, authorization code, password, and the like, as well as promotion identifying information, which may be presented to the clerk operating the transaction terminal, for entry when redeeming the promotion. For example, during a transaction, the operator may indicate to the clerk a desire to redeem the promotion, provide promotion identifying information, and show the clerk the mobile device display indicating the code which can be used to process the redemption. This technique may be beneficial in circumstances requiring a code to redeem the promotion during the transaction processing. As such, upon receiving the code, the transaction terminal may transmit the code, and optionally other transaction information, to an entity for approval prior to redeeming the promotion for the operator, or the transaction terminal may be able to authorize the code based at least in part on information stored locally to the terminal.

Upon receiving approval or upon gathering all of the promotion information, block 930 follows block 955, in which the promotion is redeemed for the respective transaction according to the promotion terms as indicated by the mobile device display and optionally as verified by one or more information sources or other back-end systems.

According to yet another embodiment, block 960 may optionally follow block 915, in which a coupon or other paper instrument can be presented to the clerk during transaction processing to redeem the promotion. As described above, in various embodiments, the redeemable promotion transmitted from the information source may include a printable document, such as an image representing a coupon or other paper instrument. Moreover, according to this embodiment, the promotion can be sent to a device other than the operator's mobile device if desired, such as via an email, a website address containing the coupon, a paper coupon, and the like. Accordingly, upon receiving the redeemable promotion, the operator can print the redeemable promotion for actual presentation to the clerk for redemption. In embodiments in which the redeemable promotion is transmitted to a mobile device, the mobile device may be connected to a printing device and the coupon or other paper instrument may be printed directly from the mobile device. In other embodiments, however, another device, such as a personal computer, may be used to print the coupon or other paper instrument.

In one embodiment, the redeemable promotion transmitted to the mobile device (or via any other means to the operator) may be a code, such as an access code, authorization code, or password that will permit printing a coupon or other paper instrument from a standalone kiosk, such as may be placed at a merchant location or near an advertisement display, for example. Thus, upon receiving the code, the operator may input the code into the kiosk for printing a coupon or other paper instrument prior to redeeming the promotion for a respective transaction. Similarly, in one embodiment, the code may be entered at a transaction terminal for printing a coupon or other paper instrument at the transaction terminal for subsequent redemption.

In another embodiment, similar to those described with reference to blocks 920 and 950, a mobile device receiving or otherwise storing a tone or operable to transmit a RFID signal can be used with a kiosk for printing a coupon or other paper instrument prior to redemption. For example, a kiosk may be operable to receive tone transmissions or RFID signals, such as by including a speaker and or an RFID receiver and associated tone or signal processing application. An operator wishing to print a coupon or other paper instrument may instruct the mobile device to transmit the tone or RFID signal, such that the kiosk can extract promotion and/or account information therefrom and print a representative coupon or other paper instrument. In one embodiment, a standalone kiosk may be in communication with one or more information sources or other back-end systems, such as may be used to retrieve promotion information, update account information, and the like. Moreover, in one embodiment, the kiosk may also be in communication with one or more merchant transaction systems, such as may be used to notify the merchant that a promotion has been activated for, and thus may be redeemed by, a given operator.

Upon presenting a coupon or other paper instrument at block 960, block 930 follows, in which the promotion is redeemed for the respective transaction according to the promotion terms as indicated on the coupon or paper instrument and optionally as verified by one or more information sources or other back-end systems.

According to yet another embodiment, block 965 may optionally follow block 915. At block 965, an operator may redeem the promotion during an online or mobile transaction. For example, information indicated by the redeemable promotion may be entered or otherwise transmitted over a website, or other mobile transaction processing application. In one embodiment, the redeemable promotion, such as an electronic file including promotion information, or an access code, authorization code, or password, can be automatically associated with the online or mobile transaction information, such as by programming instructions stored on the mobile device, associated with the tone processing application or other transaction processing application. In another embodiment, the operator may manually enter redeemable promotion information, such as an access code, authorization code, or password, in an online or mobile transaction form for submission with the transaction.

Upon entering or otherwise associating the redeemable promotion with an online or other mobile transaction, block 930 follows, in which the promotion is redeemed for the respective transaction according to the promotion terms as transmitted via the online or mobile transaction and optionally as verified by one or more information sources or other back-end systems.

At block 930, as part of redeeming the promotion, if the promotion is offered by the entity with which the transaction is being performed (e.g., at a merchant sponsoring the promotion), the entity can verify the promotion based on a unique identifier or other data, which may be transmitted as part of the redeemable promotion or previously transmitted and stored by one or more information sources. In another embodiment, the entity with which the transaction is being performed (e.g., at a third party merchant different from the promotion sponsor) may request confirmation of the promotion from another entity, such as one or more of the information sources associated with the promotion, based on the information transmitted with the redeemable promotion.

Upon redeeming the promotion, one or more entities associated with the redemption process, such as one or more information sources, may update promotion information. For example, an information source may update information associated with the promotion and/or with the operator to indicate the operator has already redeemed the promotion, which may permit restricting the operator from subsequent attempts to redeem the promotion again, if desired. In another example, information associated with the promotion may be updated to update a counter indicating the number of redemptions for the respective promotion, which may permit limiting the number of promotions redeemed. Other information associated with the promotion, the operator, and/or the transaction can be updated, such as, but not limited to, merchant information, associated product information, associated service information, purchase information, operator information, mobile device information, redemption statistics (e.g., frequency, time of day, etc.), and the like. Any or all of this information may be useful to one or more entities participating in the process, such as to report on the effectiveness, the number of redemptions, or for settlement processing. Moreover, updating the promotion information may be used during subsequent promotion processing, such as by an information source validating or activating another operator using another mobile device for the same or an associated promotion.

The method 900 may end after block blocks 930, having processed a promotion for redemption.

Accordingly, example embodiments provide systems and methods that permit communicating promotion information to a mobile device, responsive to transmitting a tone carrying tone data associated with the promotion. By associating promotion information with a tone, more potential customers may be reached, due to the simplicity of interacting with the mobile device and the immediate results made possible by real-time messaging with central and/or third party information sources. Moreover, promotion sponsors may benefit by being able to run more targeted promotions, and promotions have more exclusive, limited terms, by being able to validate and activate a promotion for each consumer upon initial contact with that individual via communicating the tone to the mobile device. In addition, the real-time or near real-time validation and activation of the promotion for a consumer creates provides additional incentive for the consumer to immediately redeem the promotion due to the convenience.

Example embodiments can provide the technical effects of creating certain systems and methods for communicating promotion information to a mobile device operator, whereby the aforementioned promotion information can be transmitted in response to transmitting one or more tones to the mobile device that are associated with such promotion information. Example embodiments can provide the further technical effects of providing mobile devices operable to receive tones, extract tone data therefrom, and to perform additional processing, display, and messaging related to promotion information associated with the extracted tone data. Moreover, example embodiments can provide the technical effects that include one or more information sources configured to store and associate tone data with promotion information, to communicate with mobile devices, to communicate with other information sources, and to perform additional processing to facilitate promotion validation and activation and redemption for mobile device operators based on the promotion information communicated by or otherwise associated with tone data.

Embodiments of the invention have been described herein with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general purpose computer, a special-purpose computer, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

In certain embodiments, performing the specified functions, elements or steps can transform an article into another state or thing. For instance, example embodiments can provide certain systems and methods that transform a tone or multiple tones to a redeemable promotion, as described above. Example embodiments can provide the further systems and methods for that transform a tone or multiple tones to a coupon or other paper certificate, which may be physically presented and redeemable at a transaction terminal in association with a promotion, as described above.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The claimed invention is:

1. A method for receiving a promotion at a mobile device, the method comprising executing computer-executable instructions performed by one or more processors for:

receiving, by a microphone associated with a mobile device from a tone transmission device, an information carrying tone, wherein the information carrying tone comprises at least one location identifier associated with stored promotion information for the promotion;

processing, by a tone processing application executed by the mobile device, the information carrying tone to extract the at least one location identifier;

transmitting, by the mobile device to an information source utilizing the extracted at least one location identifier, an indication responsive to receiving the information carrying tone;

transmitting, by the mobile device to the information source, confirmation data indicating that an operator of the mobile device has perceived selected content associated with an event tied to the promotion, wherein the confirmation data facilitates the activation of the promotion, and the confirmation data comprises a unique code or identifier; and receiving, by the mobile device based at least in part upon the information source processing the indication and the confirmation data, the promotion.

2. The method of claim 1, wherein receiving a promotion comprises receiving a redeemable promotion.

3. The method of claim 1, wherein receiving the promotion comprises receiving the promotion via at least one of a short message service (SMS) message or an email.

4. The method of claim 1, further comprising:
receiving, by the mobile device, a request for information from the operator associated with the mobile device, and
transmitting, by the mobile device to the information source, a response to the request for information.

5. The method of claim 4, wherein the request for information is presented to the operator, and further comprising:
generating, by the mobile device, the response based at least in part on input received from the operator responsive to the request for information.

6. The method of claim 4, wherein the response is generated at least in part by the tone processing application based at least in part on data stored in memory of the mobile device.

7. The method of claim 1, further comprising:
presenting, by the mobile device to the operator, a request for confirmation data input, wherein the confirmation data is generated utilizing the confirmation data input.

8. The method of claim 7, wherein the request for confirmation data input is generated at least in part by the tone processing application.

9. The method of claim 7, wherein the request for confirmation data input is received from the information source responsive at least in part to transmitting the indication.

10. The method of claim 7, wherein the confirmation data input is received based upon the user perceiving a confirmation message associated with the selected content, wherein the confirmation message is presented to the operator by one of: a television broadcast, a radio broadcast, Internet content, a public announcement system, or an advertisement display, and wherein the confirmation data is entered into the mobile device by the operator via a user interface upon the operator perceiving the confirmation message.

11. The method of claim 1, wherein the confirmation data is transmitted to the mobile device by the tone transmission device.

12. The method of claim 1, wherein the selected content comprises at least one of: a television broadcast, a radio broadcast, Internet content, a predefined event, or a predefined activity.

13. The method of claim 1, further comprising presenting the promotion for redemption in association with a payment transaction conducted by the operator.

14. The method of claim 13, wherein presenting the promotion comprises at least one of: displaying information associated with the promotion on a display of the mobile device;
transmitting an information carrying tone associated with the promotion to a transaction terminal; transmitting an information carrying tone associated with an account to the transaction terminal, wherein the promotion has been associated with the account; transmitting a radio frequency signal associated with the promotion to the transaction terminal; transmitting a radio frequency signal associated with an account to the transaction terminal, wherein the promotion has been associated with the account; transmitting an information carrying tone associated with the promotion to a kiosk for printing a paper instrument; transmitting the information carrying tone associated with the account to the kiosk for printing the paper instrument; transmitting a radio frequency signal associated with the promotion to the kiosk for printing the paper instrument; transmitting a radio frequency signal associated with an account to the kiosk for printing the paper instrument.

15. The method of claim 14, wherein displaying information associated with the promotion on the display of the mobile device further comprises displaying at least one of: an image of a coupon, a barcode, an access code, an authorization code, or a password.

16. A mobile device for receiving a promotion, the mobile device comprising:
at least one input device operable to receive an information carrying tone output by a tone transmission device, the information carrying tone comprising at least one location identifier associated with stored promotion information for the promotion;
at least one network interface operable to receive and transmit data over a network; and
at least one processor operable to execute computer-executable instructions to:
receive the information carrying tone from the tone transmission device;
process the information carrying tone to extract the at least one location identifier;
direct transmission, to an information source via the at least one network interface and based at least in part upon the at least one location identifier, of an indication responsive to receiving the information carrying tone;
direct transmission, to the information source via the at least one network interface, of confirmation data indicating that an operator of the mobile device has perceived selected content associated with an event tied to the promotion, wherein the confirmation data facilitates the activation of the promotion, and the confirmation data comprises a unique code or identifier,
wherein the promotion is received by the mobile device based at least in part upon the information source processing the indication and the confirmation data.

17. The mobile device of claim 16, wherein the promotion comprises a redeemable promotion.

18. The mobile device of claim 16, wherein the at least one processor is further operable to execute the computer-executable instructions to:
receive a request for information from the operator associated with the mobile device, and
direct transmission, to the information source via the at least one network interface, of a response to the request for information, wherein the response is based at least in part on at least one of: input received from the operator, or data stored in memory of the mobile device.

19. The mobile device of claim 16, wherein the at least one processor is further operable to execute the computer-executable instructions to:
   direct a presentation of a request for confirmation data input;
   receive the confirmation data input; and
   generate the confirmation data utilizing the confirmation data input.

20. The mobile device of claim 16, wherein the at least one processor is further operable to execute the computer-executable instructions to display information associated with the promotion for redemption.

21. The mobile device of claim 20, wherein the information displayed comprises at least one of: an image of a coupon, a barcode, an access code, an authorization code, or a password.

22. The mobile device of claim 16, wherein the at least one processor is further operable to execute the computer-executable instructions to direct transmission of an information carrying tone to a transaction terminal for redemption, wherein the information carrying tone is associated with at least one of: the promotion, or an account associated with the promotion.

23. The mobile device of claim 16, wherein the at least one processor is further operable to execute the computer-executable instructions to direct transmission of a radio frequency signal to a transaction terminal for redemption, wherein the radio frequency signal is associated with at least one of: the promotion, or an account associated with the promotion.

24. The mobile device of claim 16, wherein the at least one processor is further operable to execute the computer-executable instructions to cause a paper instrument be printed via a printing device for redemption.

25. A computer program product for processing promotion information, comprising a computer usable medium having a computer readable program code embodied therein, the computer readable code adapted to be executed by one or more processors to:
   receive an information carrying tone at a mobile device from a tone transmission device, wherein the information carrying tone comprises at least one location identifier associated with stored promotion information for a promotion;
   process the information carrying tone to extract the at least one location identifier;
   transmit, to an information source utilizing the extracted at least one location identifier, an indication responsive to receiving the information carrying tone;
   transmit, to the information source, confirmation data indicating that an operator of the mobile device has perceived selected content associated with an event tied to the promotion, wherein the confirmation data facilitates the activation of the promotion, and the confirmation data comprises a unique code or identifier; and
   receiving, based at least in part upon the information source processing the indication and the confirmation data, the promotion.

\* \* \* \* \*